United States Patent
Kravitch

(10) Patent No.: US 8,082,823 B2
(45) Date of Patent: Dec. 27, 2011

(54) SCRAPING TOOL

(76) Inventor: Nick C. Kravitch, Aliquippa, PA (US)

( * ) Notice: Subject to any disclaimer, the term of this patent is extended or adjusted under 35 U.S.C. 154(b) by 492 days.

(21) Appl. No.: 12/288,670

(22) Filed: Oct. 22, 2008

(65) Prior Publication Data

US 2010/0095467 A1  Apr. 22, 2010

(51) Int. Cl.
*B23B 5/14* (2006.01)
*B23B 13/00* (2006.01)

(52) U.S. Cl. .............................................. 82/1.11; 82/47

(58) Field of Classification Search ............. 82/70.2, 82/59, 1.11, 47, 48, 113; 15/104.04; 83/13, 83/54
See application file for complete search history.

(56) References Cited

U.S. PATENT DOCUMENTS

| | | | |
|---|---|---|---|
| 3,613,489 A * | 10/1971 | Randich | 82/70.2 |
| 3,848,489 A * | 11/1974 | Santana | 82/61 |
| 4,091,514 A | 5/1978 | Motes-Conners et al. | 29/33 T |
| 4,430,913 A * | 2/1984 | Williamson | 82/70.2 |
| 4,934,109 A | 6/1990 | Allred | 51/241 |
| 5,054,342 A | 10/1991 | Swiatowy et al. | 82/113 |
| 5,364,207 A | 11/1994 | Reber et al. | 405/303 |
| 5,430,921 A * | 7/1995 | McGuire | 29/401.1 |
| 5,549,024 A | 8/1996 | Ricci | 82/113 |
| 5,613,807 A | 3/1997 | Reber et al. | 405/156 |
| 5,624,206 A | 4/1997 | Cohen et al. | 405/157 |
| 5,639,394 A | 6/1997 | Conley | 219/535 |
| 5,894,771 A * | 4/1999 | Braun et al. | 82/47 |
| 5,894,772 A | 4/1999 | Nodar | 82/113 |
| 6,669,406 B2 | 12/2003 | Hutton et al. | 405/184.1 |
| D492,950 S | 7/2004 | Place | D15/130 |
| 6,786,118 B1 * | 9/2004 | Lumm et al. | 82/70.2 |
| 6,920,812 B2 * | 7/2005 | Jackson et al. | 82/70.2 |
| 2002/0129684 A1 | 9/2002 | Oswald | 82/113 |
| 2004/0188013 A1 | 9/2004 | Temple | 156/281 |
| 2005/0022353 A1 | 2/2005 | Viola et al. | 29/412 |

FOREIGN PATENT DOCUMENTS

JP    1024272    1/1998

* cited by examiner

*Primary Examiner* — Will Fridie, Jr.
(74) *Attorney, Agent, or Firm* — Price & Adams

(57) ABSTRACT

A stationary frame is positioned in surrounding relation with the surface of a polyethylene conduit to be prepared for scraping preliminary to performing electrofusion on the conduit by a keyhole operation in an excavated underground location. A scraper tool is mounted on the frame in a fixed longitudinal position to rotate around the surface of the conduit. A cutting blade of the scraping tool extends longitudinally a preselected length on the conduit into contact with the surface of the conduit. Rotation of the scraper tool carries the cutting blade completely around the surface of the conduit to remove a uniform layer of material from the surface of the conduit. Any out of roundness existing in the conduit is removed before the scraping operation is commenced. Uniform compression is applied by split clamps surrounding the conduit. Compression of the clamps restores the conduit to a concentric configuration preliminary to the electrofusion operation.

20 Claims, 25 Drawing Sheets

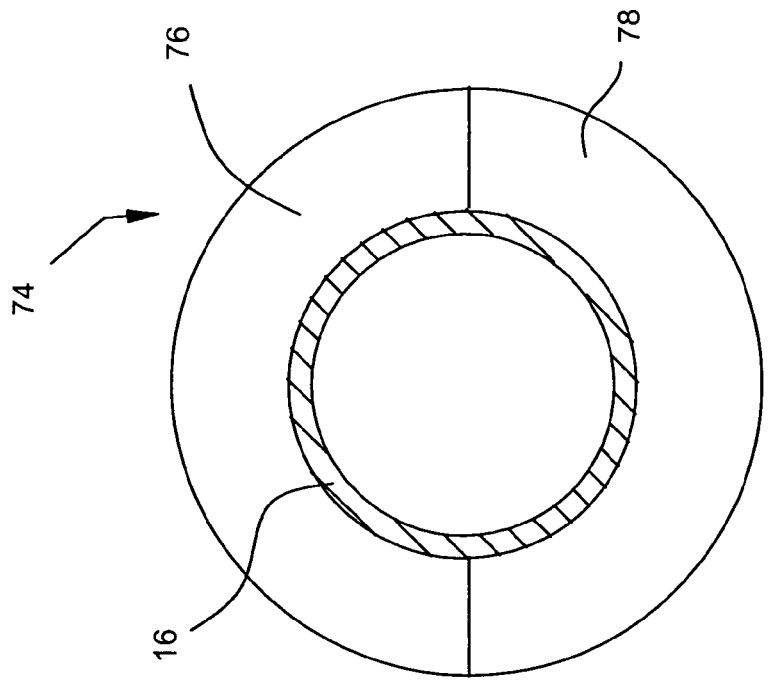
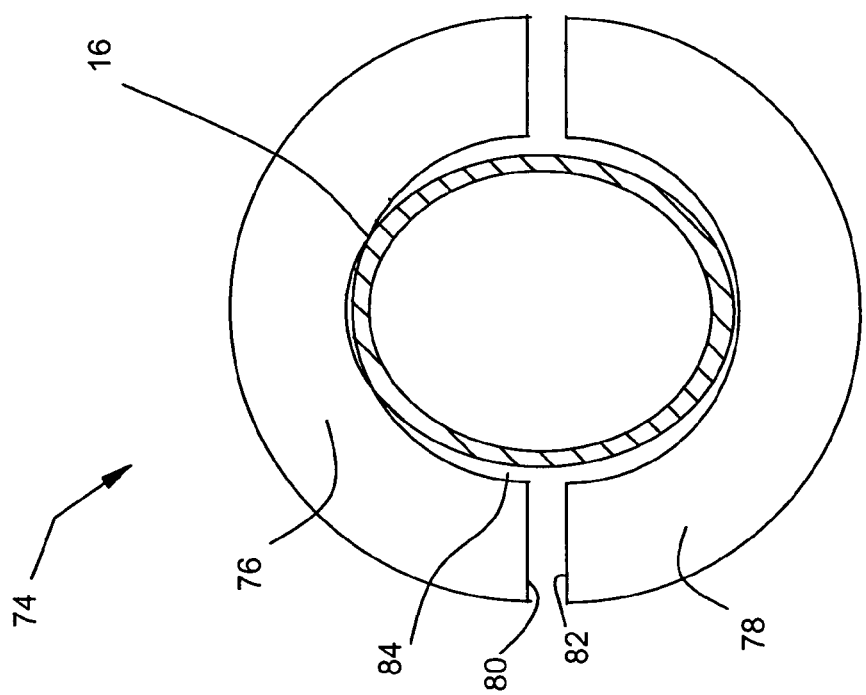
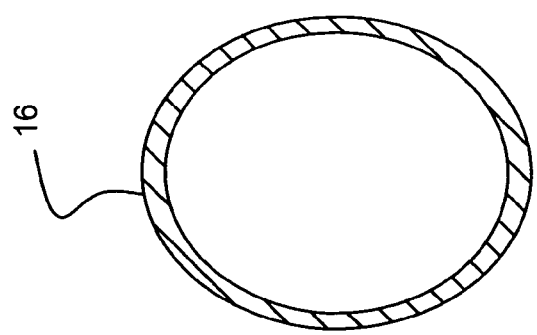

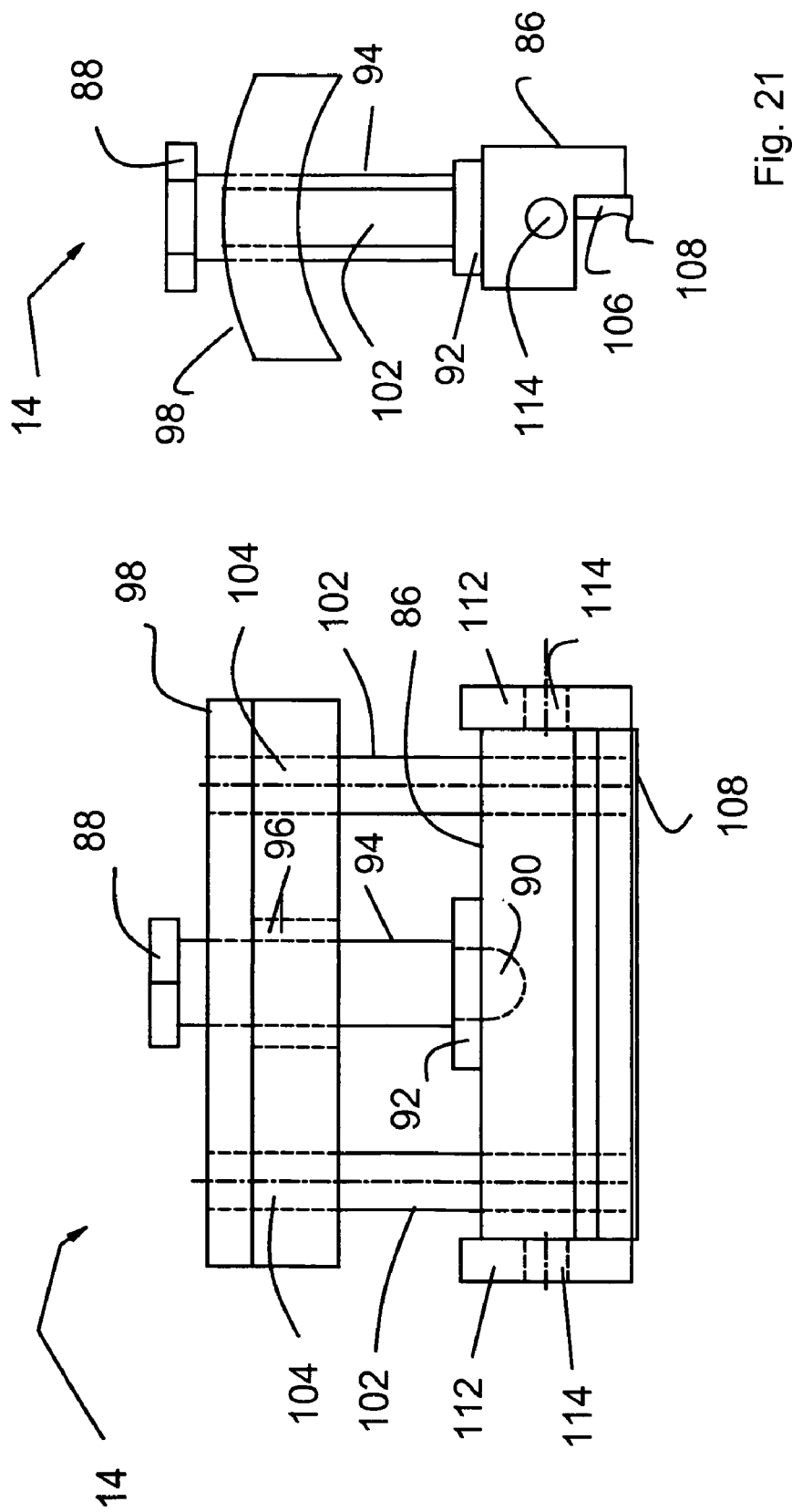

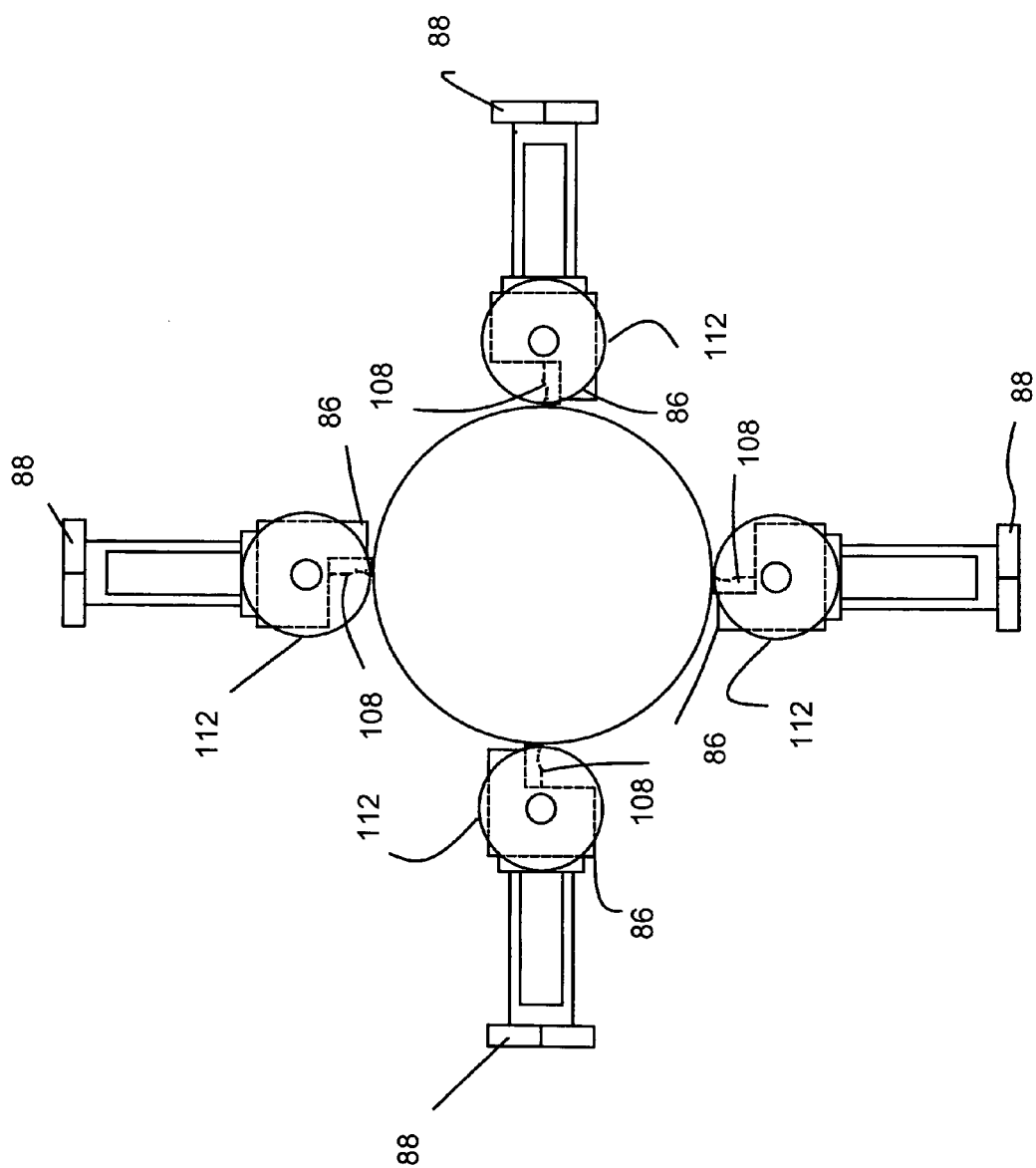

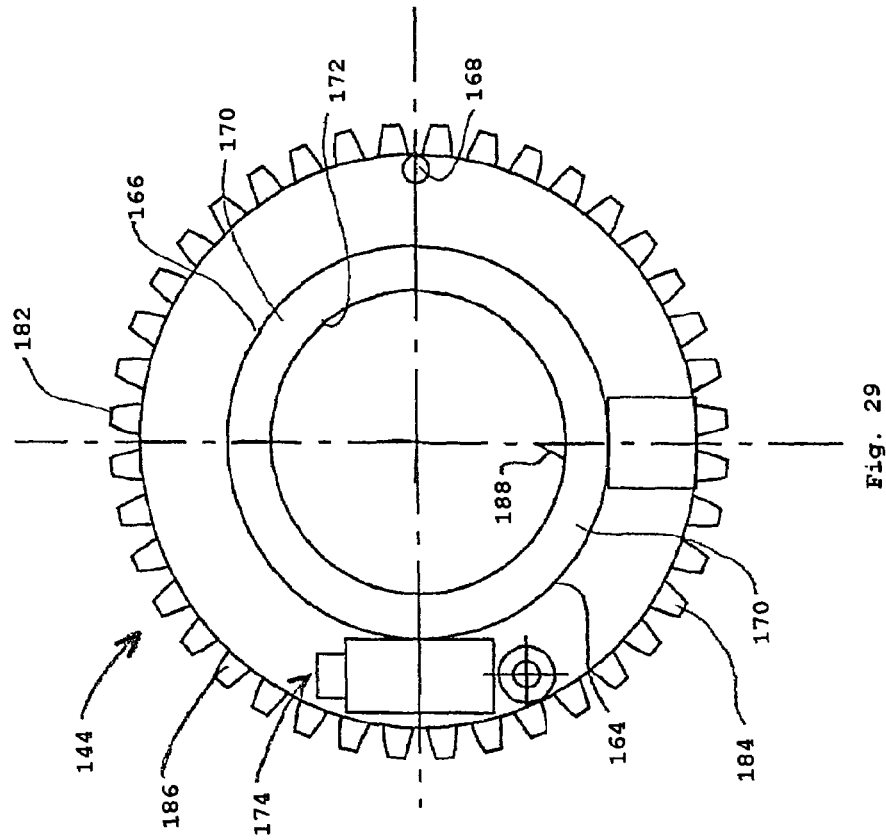
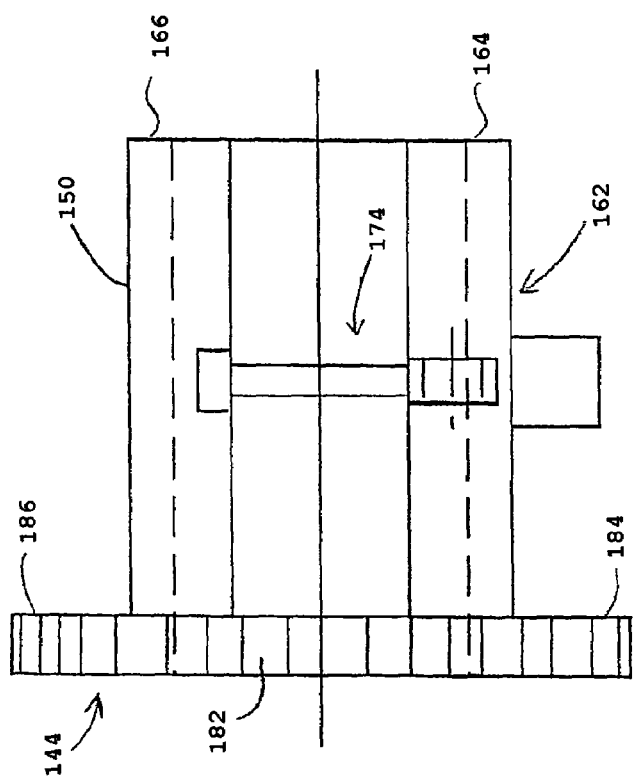

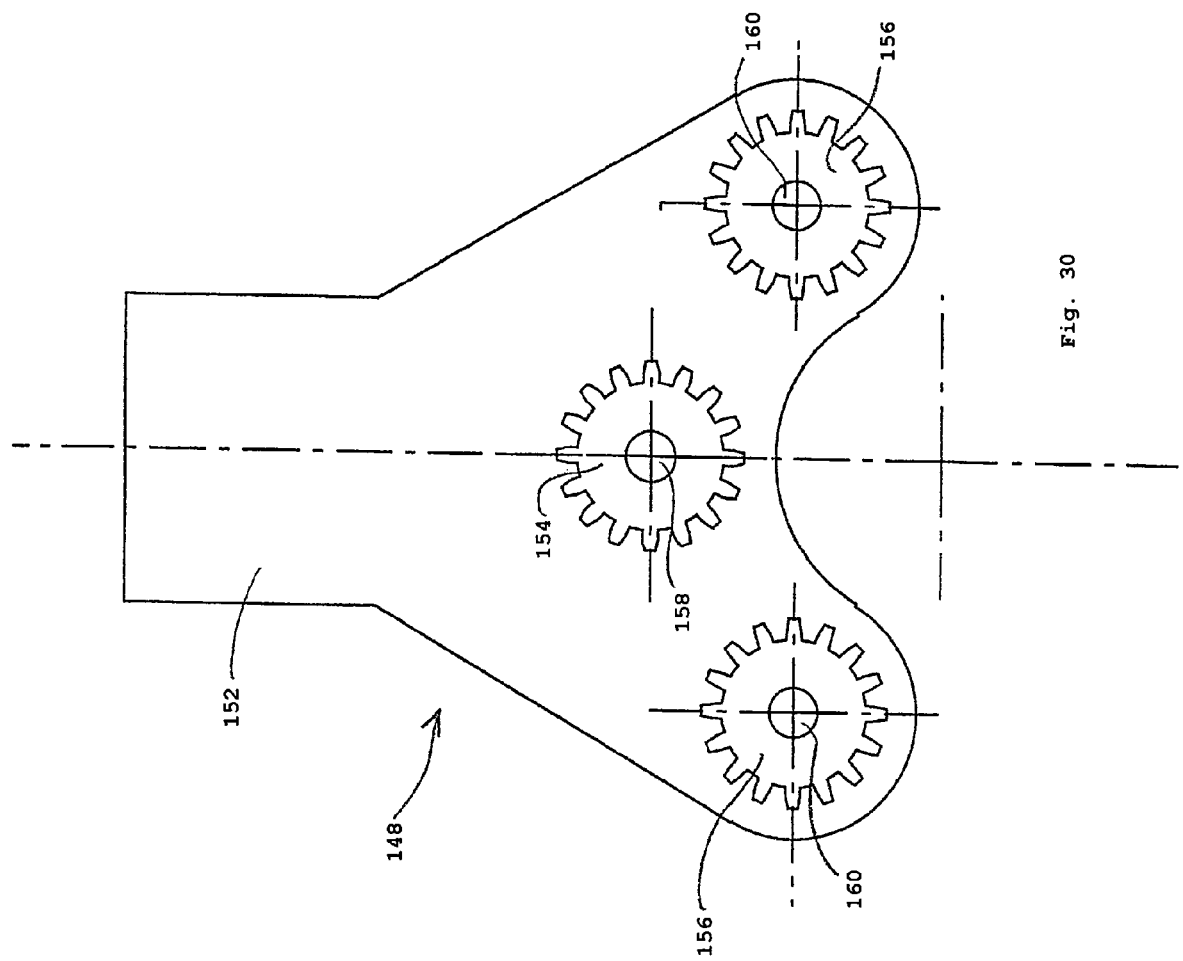

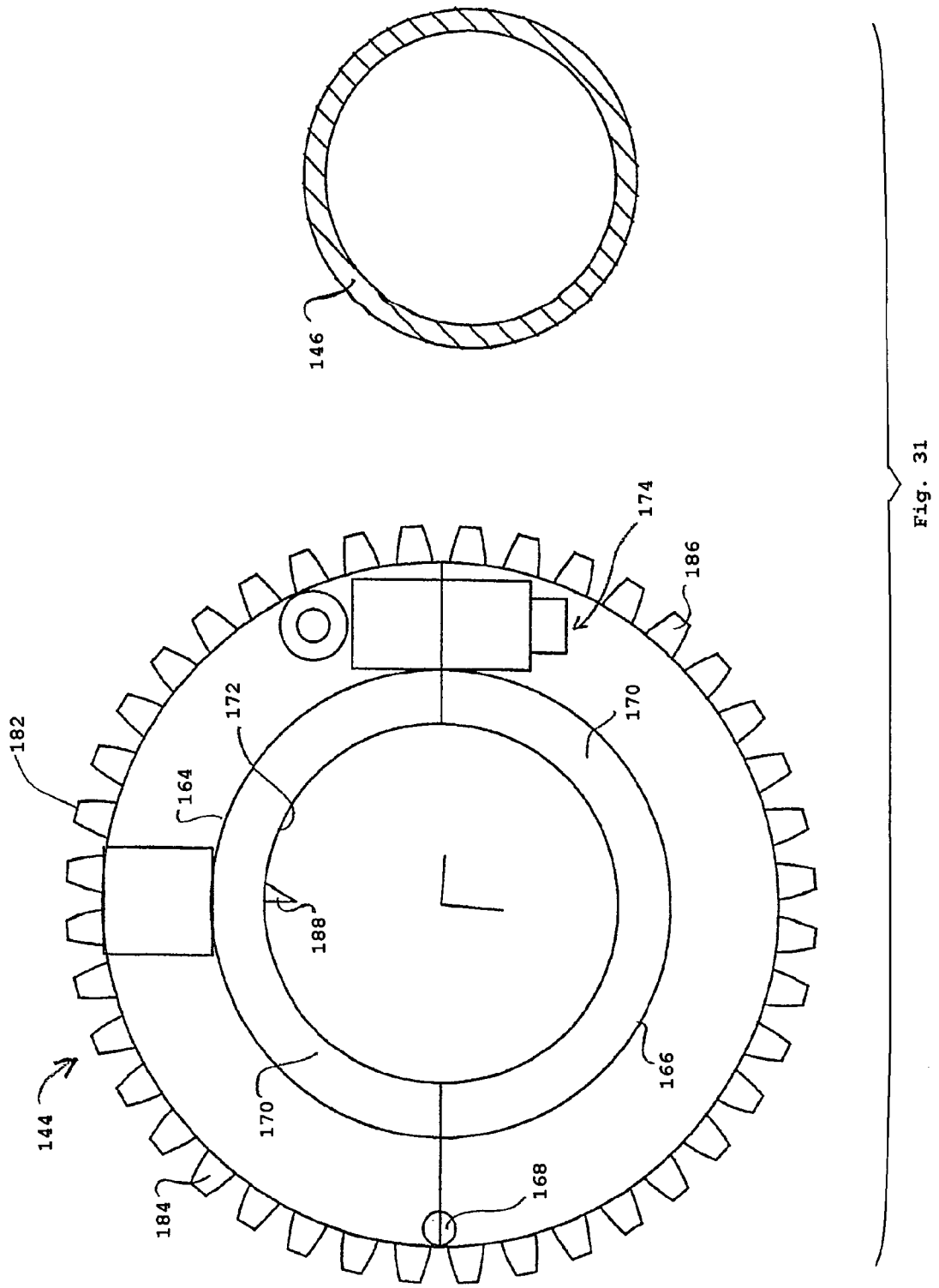

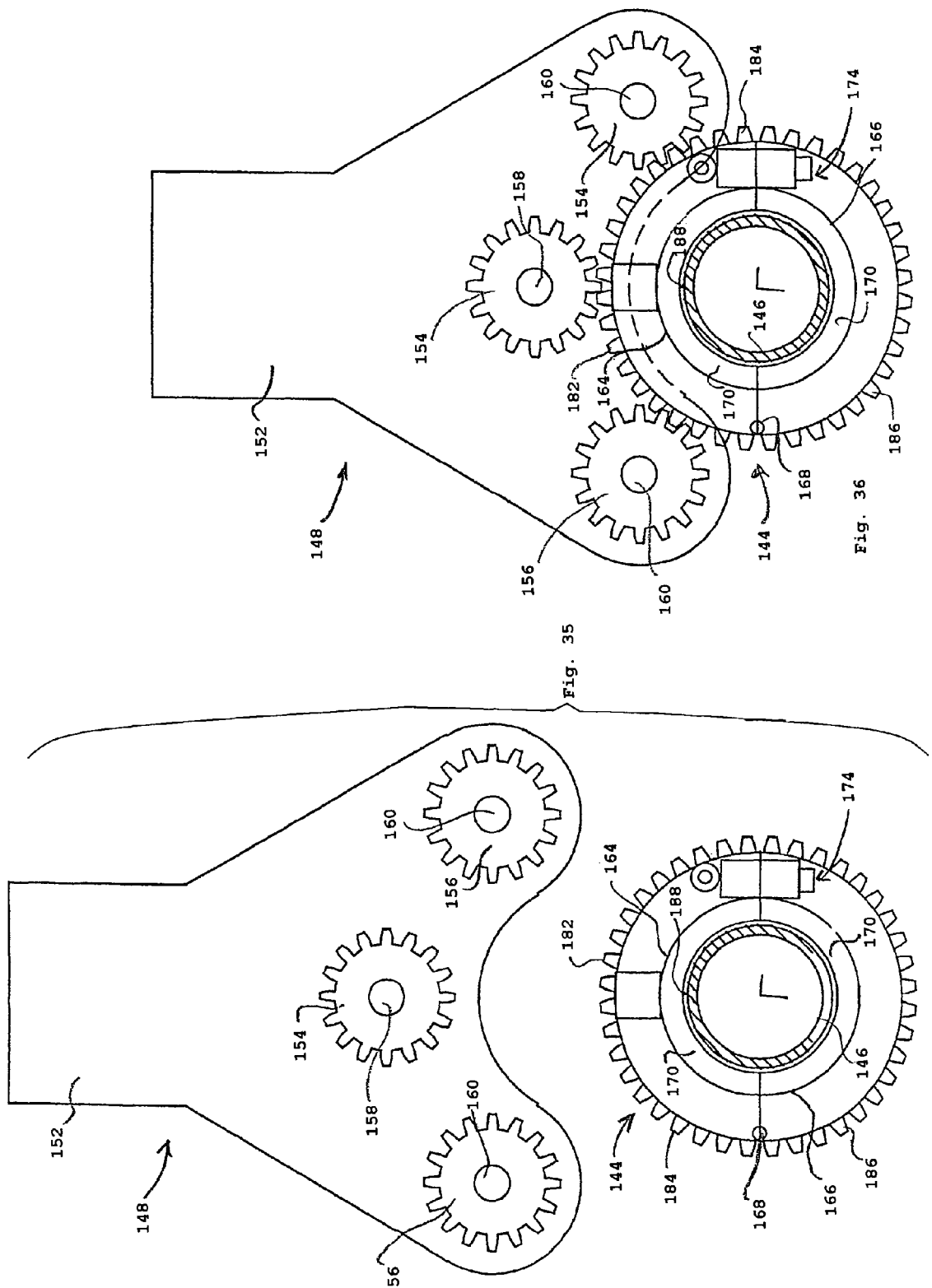

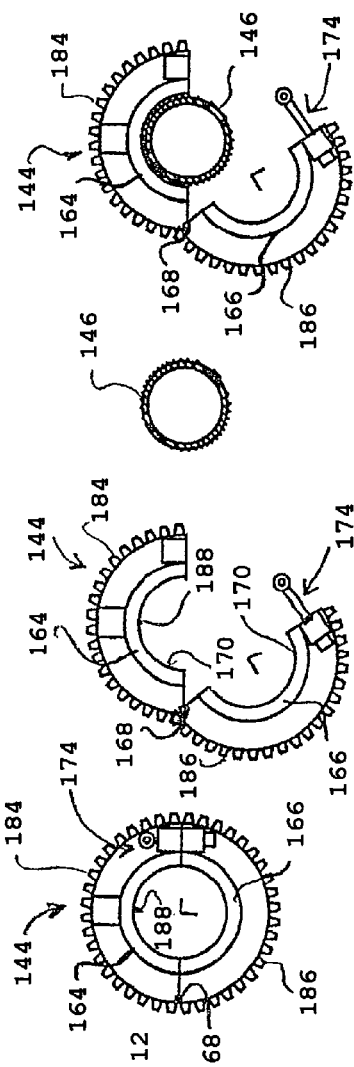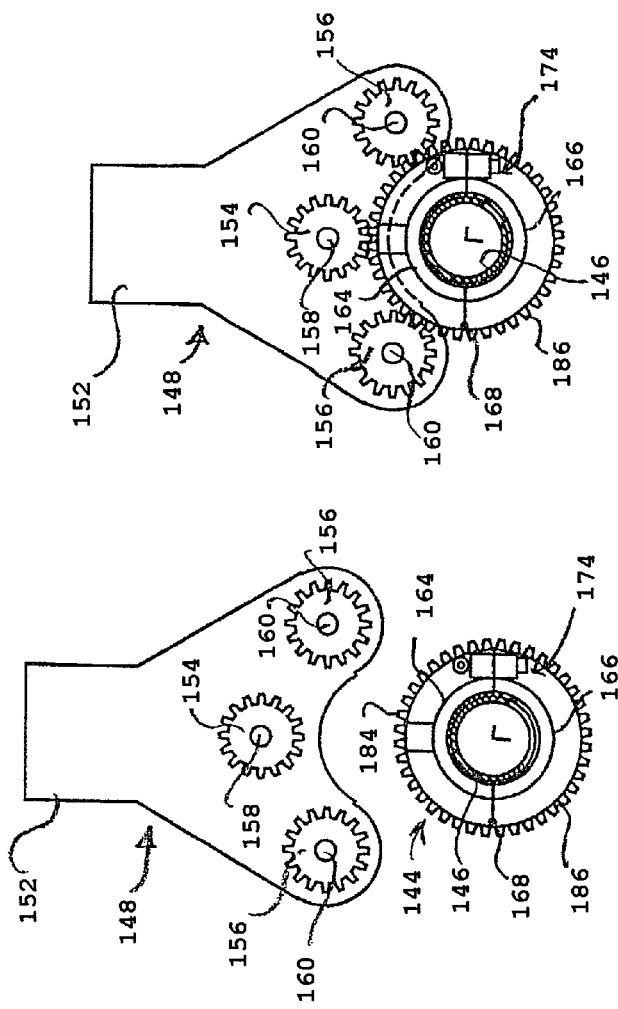

SCRAPING TOOL

BACKGROUND OF THE INVENTION

1. Field of the Invention

This invention relates to a scraping tool, and more particularly, to an improved apparatus and method for preparing the outer surface of polyethylene conduits in keyhole excavation operations for natural gas and water lines, as well as underground fluid lines.

2. Description of the Prior Art

Metal conduits, particularly iron or steel conduits, have been used in various applications, including the distribution of natural gas and water through service lines. These conduits or pipes are connected together typically by conventional joining methods, such as welding. The joining methods typically require one or more machining, cutting, polishing, grinding, scraping, or cleaning operations. Various devices have been disclosed to perform these types of operations.

U.S. Pat. No. 5,549,024 discloses a clamshell machining lathe for cutting and finishing pipes in industrial settings. The lathe includes a pair of annual members, including a stationary member for clamping and a rotatable member for cutting and finishing. The stationary member attaches to a pipe. The rotatable member rotates around the pipe. A cutting tool and an end finishing tool extend from the rotatable member to perform cutting and finishing operations on the pipe. The end finishing tool is advanced manually in a longitudinal direction along the length of the pipe through the use of a crank wheel. Alternatively, the end finishing tool is advanced using a step motor.

U.S. Pat. No. 6,786,118 discloses a device for machining a shaft. The device includes a frame support and a tool support. The tool support is mounted on the frame support to move a tool in a longitudinal direction relative to the shaft via a worm drive.

U.S. Design Pat. No. D492,950 discloses an ornamental design for a journal turning lathe. The lathe includes a plurality of annular rings connected to a plurality of cylindrical, longitudinal members. The annular rings appear to be designed to surround a shaft or pipe for machining.

Various devices have been disclosed for performing grinding or shaving operations to facilitate the welding of metal conduits. U.S. Pat. No. 4,934,109 discloses a grinder assembly having a body portion that includes a pair of legs extending therefrom. A shaft also extends from the body and has a grinder section that includes a body, a grinder, a grinding wheel, and a wheel rotating device. The grinding wheel performs a grinding operation to provide a V-shaped bevel.

U.S. Patent Application Publication No. 2002/0129684 discloses a pipe shaver. The piper shaver includes a cutting blade, housing, lifting means, a lever, and a threaded cam. The lever manually urges the blade radially outwardly away from the pipe. The threaded cam moves a cutting edge on the cutting blade longitudinally along the outer diameter of the pipe to shave a thin, substantially uniform layer of material from the outer diameter of the pipe.

Various portable machining or joining devices have also been disclosed. U.S. Pat. No. 5,054,342 discloses a portable pipe machining apparatus for cutting pipe or preparing the end of a pipe for a subsequent joining operation, such as welding. The pipe machining apparatus includes a frame that includes two joined semicircular sections for radially surrounding a pipe. A tool carrier is rotatably mounted on the frame by a plurality of roller bearings. The tool carrier includes a pair of cutting tools that rotate about the pipe. The apparatus also includes a bearing means that can be adjusted between the frame and the tool carrier to compensate for the wear of individual bearings during use.

U.S. Pat. No. 4,091,514 discloses a machine tool for preparing the end of a pipe in a subsea location for receiving an overfitting coupling. The tool includes a support beam assembly and a remotely operable hydraulic pipe clamp for clamping the pipe. The support beam assembly supports an axially movable carriage, a split frame, and a split ring gear. The split ring gear forms a spool assembly. A face plate extends from the spool assembly. The face plate includes a milling machine for milling the pipe surface and sensing tool for monitoring the milling machine.

Plastic conduits, particularly polyethylene conduits, have been replacing iron and steel conduits in the distribution of natural gas, water, and other fluids through service lines. The metal composition of iron and steel conduit that is used in underground applications makes it susceptible to corrosion and deterioration due to cathodic action. Polyethylene conduit used for natural gas and water service provides the long term benefits of corrosion resistance and durability.

Not only is polyethylene used to fabricate gas pipelines, it is also used in the fabrication of valves, fittings, couplings and the like for controlling gas flow through the pipelines. The joints between pipelines and polyethylene valves can be connected by butt fusion and electrofusion to eliminate the need for conventional threaded connections and fastening nuts. U.S. Pat. No. 5,639,394 discloses a polyethylene valve assembly formed by electrofusing a coupling to pipe end fittings.

Plastic pipes, pipe end fittings, couplings and valves typically undergo cleaning operations before being joined. Various portable cleaning methods are well known. Japanese Patent Document No. JP 10024272 A discloses a method for cleaning a polyethylene pipe for subsequent electrofusion. Sheet material is impregnated with organic solvents and housed in a hermetically sealed container. A worker removes the sheet material from the container at the worksite and wipes the pipe outer surface to prepare the surface for electrofusion.

U.S. Patent Application Publication No. 2004/0188013 discloses a pipe fusion device that includes a cleaning mechanism. The cleaning mechanism includes a pair of plates that form a retaining mechanism. The retaining mechanism holds a flexible wiper that cleans the outer surface of a pipe that has been inserted into the pipe fusion device.

U.S. Pat. No. 5,894,772 discloses a portable polyethylene pipe machining tool for cutting plastic pipe. The tool includes a fixed cylindrically-shaped frame that is attached to a polyethylene pipe for cutting and finishing and a rotatable frame that rotates relative to the fixed frame. The tool also includes a parting tool assembly that performs scraping and finishing operations. The parting tool assembly moves longitudinally along the pipe outer surface during the scraping and finishing operations.

U.S. Patent Application Publication No. 2005/0022353 discloses a portable plastic pipe cutter. The cutter includes a table for supporting a pipe, means for rotating the pipe relative to the support, and a cutter for cutting the pipe during rotation. The rotating means utilizes a scissor mechanism having pressure wheels to rotate the pipe. The cutter includes a cutter saw and a handle.

The process of joining underground pipes through electrofusion and other means typically requires significant excavation of the ground around the joint. U.S. Pat. No. 5,624,206 discloses a platform for supporting pipes during an excavation. The platform includes a pair of flat rectangular shoring members with support braces attached thereto. The platform also includes a jack member for pushing against the sides of the excavation. A pair of clamps extends from the support braces to connect the pipes to the platform.

U.S. Pat. No. 5,430,921 discloses a cutting apparatus for a pipe that includes a frame formed from two parallel longitudinal members connected by end beams. Each end beam is attached to a chain that encircles the pipe. A cutter unit is mounted on one of the longitudinal members.

The excavation operations cause considerable disruption to the surrounding landscape. The operations also limit the location of underground pipes with respect to buildings. Various devices for facilitating the joining operations of underground pipes have been disclosed. Accordingly, it is particularly desirable to minimize the disruption to the surrounding landscape.

The need to minimize disruption to the surrounding landscape has led to the development of minimally invasive technology or "keyhole" excavations. The objective of keyhole excavation is to perform as much work underground with the smallest possible ground opening. The target holes are typically 18 inches in diameter but may be as small as twelve inches in diameter. The technology to cut pavement coupons and excavate downwardly to a pipe section for joining is well-known. Accordingly, there is a need for improved keyhole excavation devices.

U.S. Pat. Nos. 5,364,207 and 5,613,807 disclose a method and an apparatus for making service connections to polyethylene pipe. The method involves excavating a hole that is less than two feet in diameter to locate the pipe for connection. An electrofusion apparatus and a polyethylene pipe for connection are introduced into the hole. The electrofusion apparatus including a heating element is positioned on top of the polyethylene pipe. An opening is drilled into the polyethylene pipe through the fused stack to allow the polyethylene pipe to be fused. The heating element and fused stack are withdrawn.

U.S. Pat. No. 6,669,406 discloses an apparatus for cleaning the surface of an underground polyethylene pipe in preparation for an electrofusion operation. The apparatus includes a handle and a milling assembly. The milling assembly includes a rotatable cutter that is mounted on a plate. However, the cutter only rotates 180° around the outer surface of the pipe to perform the milling operation, so that there is an inherent risk that the outer surface will not be concentric. Therefore, any variations in the concentricity or roundness of the external surface of the pipe must be corrected before the milling operation is performed. Accordingly, there is need for an improved method and apparatus for preparing polyethylene conduits for repair using keyhole excavation operations for underground fluid lines.

SUMMARY OF THE INVENTION

In accordance with the present invention there is provided apparatus for preparing the surface of polyethylene conduit that includes a stationary frame for positioning in surrounding relation with the conduit extending axially through the frame. A housing is rotatably positioned within the frame adjacent to the conduit. Support means rotatably supports the housing within the frame for rotation of the housing around the conduit. A scraper tool assembly is mounted on the housing in a fixed longitudinal position for rotation with the housing around the surface of the conduit. The scraper tool assembly includes a blade having a cutting edge extending longitudinally a preselected length on the conduit. An adjustment mechanism on the scraper tool assembly moves the cutting edge into and out of contact with the surface of the conduit to remove a uniform layer of material from the outer surface of the conduit. A drive transmission device rotates the housing within the fixed frame to rotate the scraping tool around the surface of the conduit so that the cutting edge removes a layer of material from the surface of the conduit the length of the cutting edge around the circumference of the conduit.

Further, in accordance with the present invention, there is provided apparatus for reshaping the surface of a polyethylene conduit that includes a pair of split clamps. Each pair of the split clamps includes a first semicylindrical shaped portion and a second semicylindrical shaped portion forming a cylindrical opening therebetween. Each of the first and second semicylindrical shaped portions is positioned in spaced surrounding relation with the polyethylene conduit having a surface being out of round. A split cylindrical housing having a pair of oppositely positioned members is movable into and out of surrounding compressive relation with the pair of split clamps on the polyethylene conduit. The cylindrical housing members are connected to apply a radial compressive force on the first and second semicylindrical shaped portions of the pair of split clamps to compress the polyethylene conduit within the cylindrical opening to restore the surface of the conduit to a round configuration.

In addition, the present invention is directed to a method for preparing the surface of a polyethylene conduit that includes the steps of rotatably supporting a blade having a cutting edge adjacent to the surface of the conduit. The cutting edge is positioned to extend a preselected length on the surface of the conduit. The cutting edge is moved radially into contact with the surface of the conduit. The blade positioned in contact with the conduit is rotated around the conduit to advance the cutting edge on the conduit to remove a layer of material from the surface of the conduit the length of the cutting edge.

A principal object of the present invention is to provide a method and apparatus for preparing the surface of underground polyethylene conduit for repair using keyhole technology.

A further object of the present invention is to provide a scraping tool for installation through a small diameter hole to prepare the surface of an underground polyethylene pipe for repair by electrofusion operations.

Another object of the present invention is to provide a scraping tool for removing a selected thickness of material from the outer surface of polyethylene pipe by a cutting edge extending longitudinally on the pipe and rotating around the polyethylene pipe.

An additional object of the present invention is to provide a scraping tool for use in keyhole technology repair of underground polyethylene pipe where a continuous length of material is removed from the surface of the pipe by rotation of a cutting edge around the pipe.

A further object of the present invention is to provide a scraping tool for removing an outer layer of material from the surface of polyethylene pipe by one or more cutting blades extending longitudinally on the pipe and a controlled depth into the surface of the pipe.

Another object of the present invention is to prepare the surface of an underground polyethylene pipe for repair by electrofusion by first correcting any out of roundness of the conduit followed by removing a uniform layer of material from the outer surface of the conduit.

These and other objects of the present invention will be more completely described and disclosed in the following specification, accompanying drawings, and appended claims.

BRIEF DESCRIPTION OF THE DRAWINGS

FIG. 15 is an end view of an out of round polyethylene conduit.

FIG. 16 is an end view of a split bearing clamp device of the scraper tool positioned in surrounding relation with the out of round conduit shown in FIG. 15.

FIG. 17 is an end view of the split bearing clamp compressing the out of round conduit shown in FIG. 16 into a concentric configuration preliminary to the scraping operation.

FIG. 20 is a schematic view in side elevation of a blade holder for controlling the position of the cutting blade on the surface of the polyethylene conduit.

FIG. 21 is an end view in side elevation of the blade holder shown in FIG. 20, illustrating the position of the cutting blade on the blade holder.

FIG. 27 is a view similar to FIG. 26 of a four blade arrangement for scraping the surface of the polyethylene conduit.

FIG. 28 is a view in side elevation of a further embodiment of the scraper tool, illustrating a pivotally connected split housing for supporting the cutting blade in contact with the polyethylene conduit.

FIG. 29 is an end view of the scraper tool shown in FIG. 28.

FIG. 30 is a view in side elevation of a driver assembly for transmitting rotation to the scraper tool.

FIG. 31 is view in side elevation of the scraper tool moved into position adjacent to a polyethylene conduit for scraping.

FIG. 35 is a view in side elevation of the driver assembly shown in FIG. 30 moved into position adjacent to the scraper tool clamped onto a pipe for scraping.

FIG. 36 is a view of the scraper tool shown in FIG. 35, illustrating the driver assembly drivingly connected to the scraper tool.

FIGS. 37A-37F are views in side elevation of the sequence of steps of positioning the scraper tool on the conduit and engaging the driver assembly with the scraper tool to drive the scraper tool for scraping the conduit.

DESCRIPTION OF THE PREFERRED EMBODIMENTS

Figure 1:
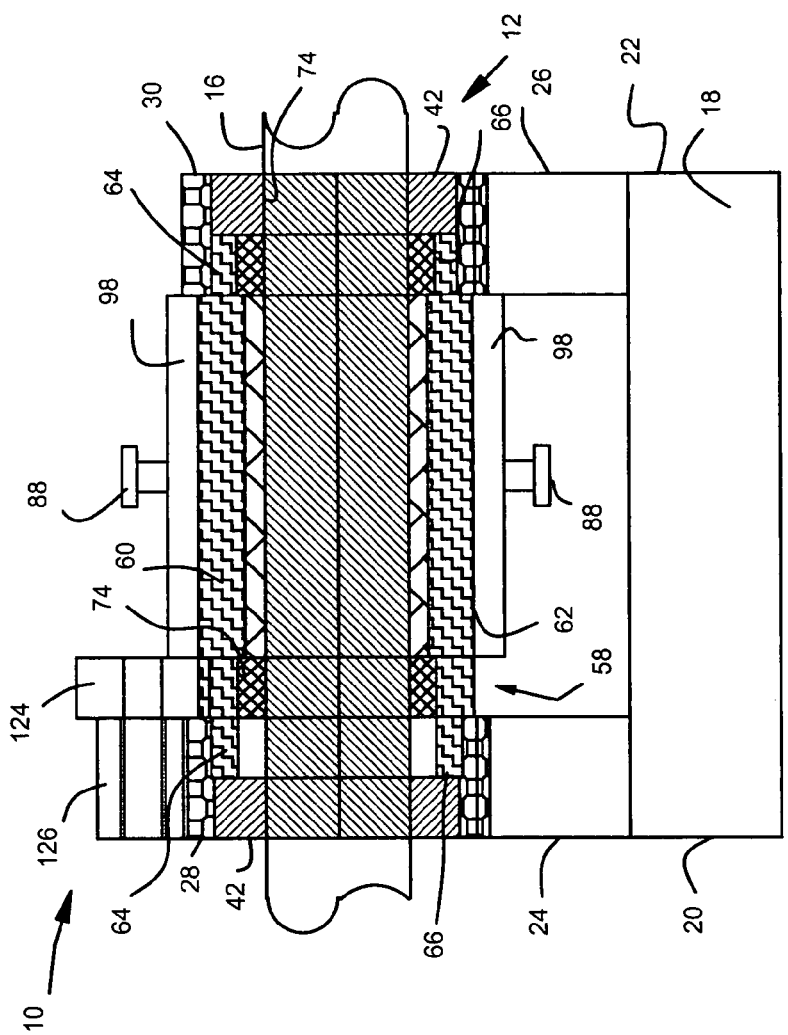
FIG. 1 is a view in side elevation of a scraper tool for preparation of the surface of polyethylene conduit, illustrating a longitudinally extending cutting blade radially adjustable into and out of contact with the surface of the pipe.
Figure 2:
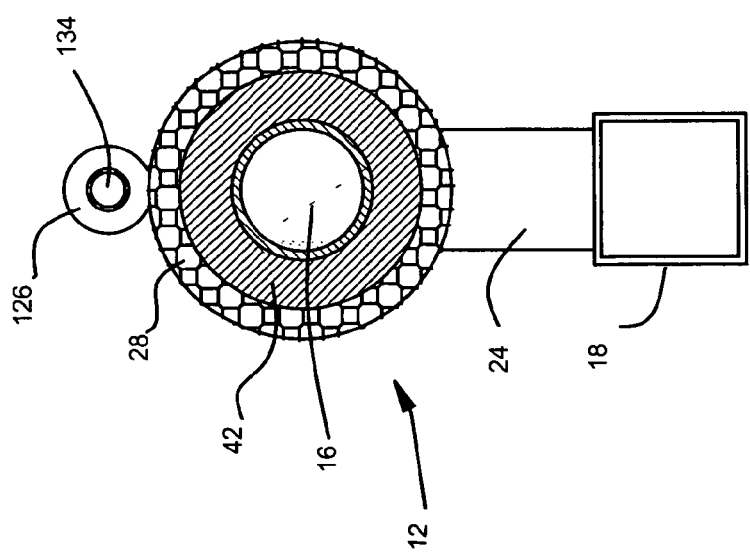
FIG. 2 is an end view of the scraper tool shown in FIG. 1.
Figure 12:
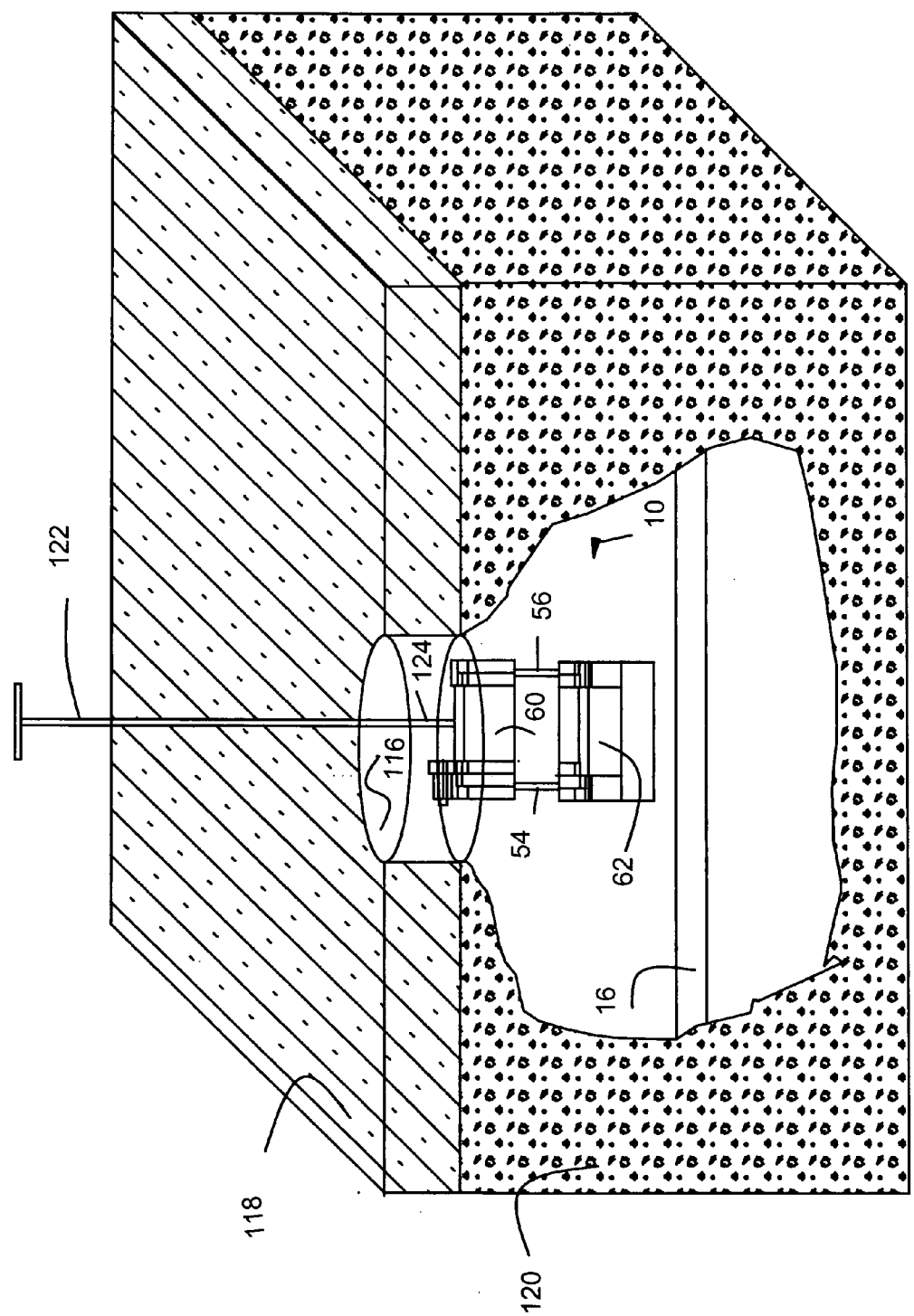
FIG. 12 is a schematic illustration of the scraper tool shown in FIG. 1 lowered into a keyhole excavation to repair an underground polyethylene conduit.
Figure 13:
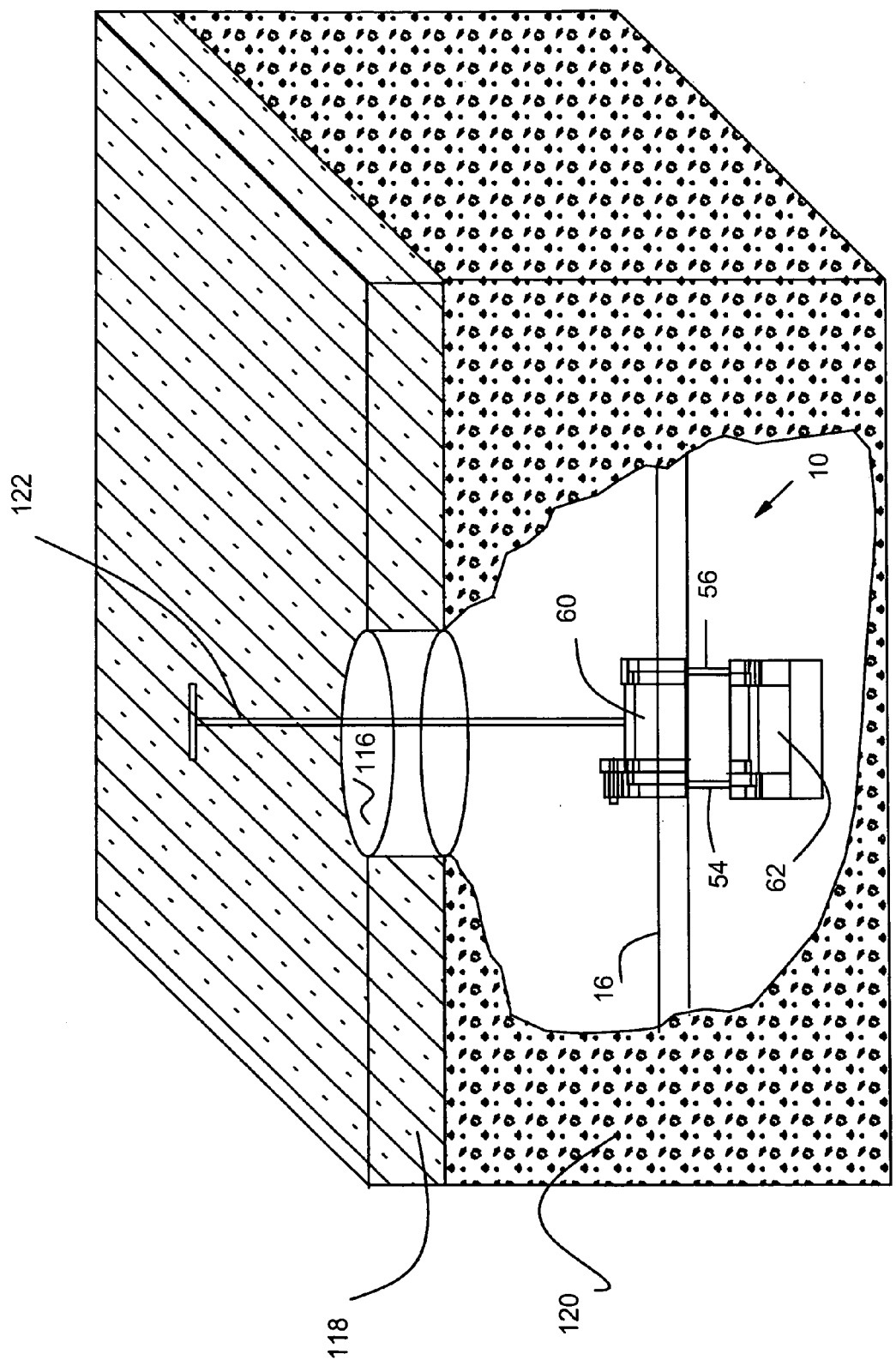
FIG. 13 is a schematic illustration similar to FIG. 12 of the scraper tool advanced through a keyhole into position on the polyethylene conduit.
Figure 14:
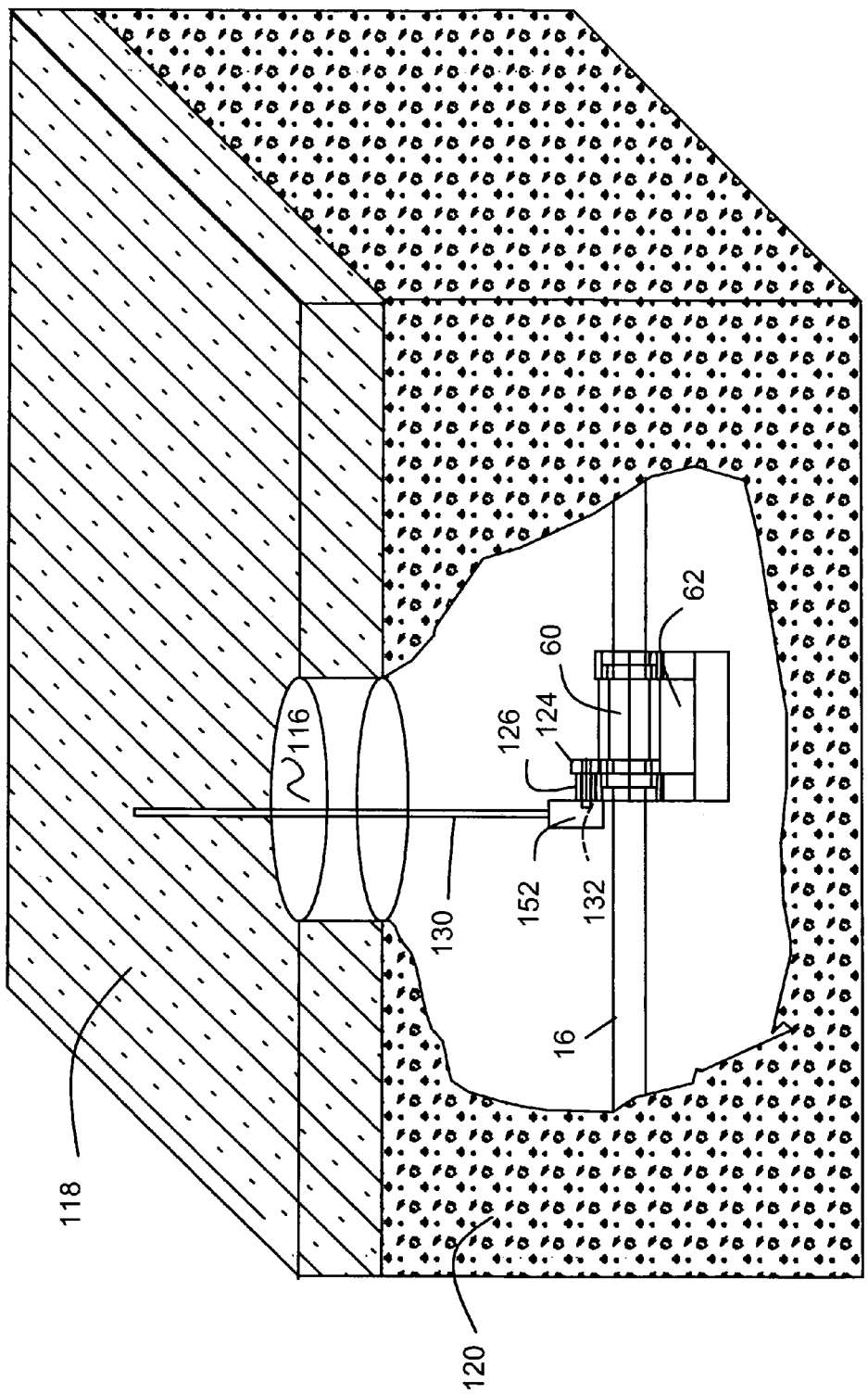
FIG. 14 is another schematic illustration of the scraper tool clamped into position on the conduit in an underground excavation.

Referring to the drawings and particularly to FIGS. 1 and 2, there is illustrated a scraper tool assembly generally designated by the numeral 10 for preparing the surface of polyethylene conduit used in underground natural gas and water and fluid conduits pipelines for repair by an electrofusion process. As illustrated in FIGS. 12-14, the tool assembly 10 prepares the surface of a polyethylene conduit by restoring roundness of the conduit removing dirt and/or oxidation from the surface of the conduit so that a valve/clamping tool, sleeve, coupling or the like can be welded by electrofusion to the polyethylene conduit.

The tool assembly 10 includes a stationary frame generally designated by the numeral 12 for rotatably supporting a scraper assembly generally designated by the numeral 14. The scraper assembly 14 is mounted within the frame 12 in a fixed longitudinal position for rotation around the surface of a polyethylene conduit or pipe 16 that extends through the scraper assembly 14 and surrounded by the frame 12.

Figure 3:
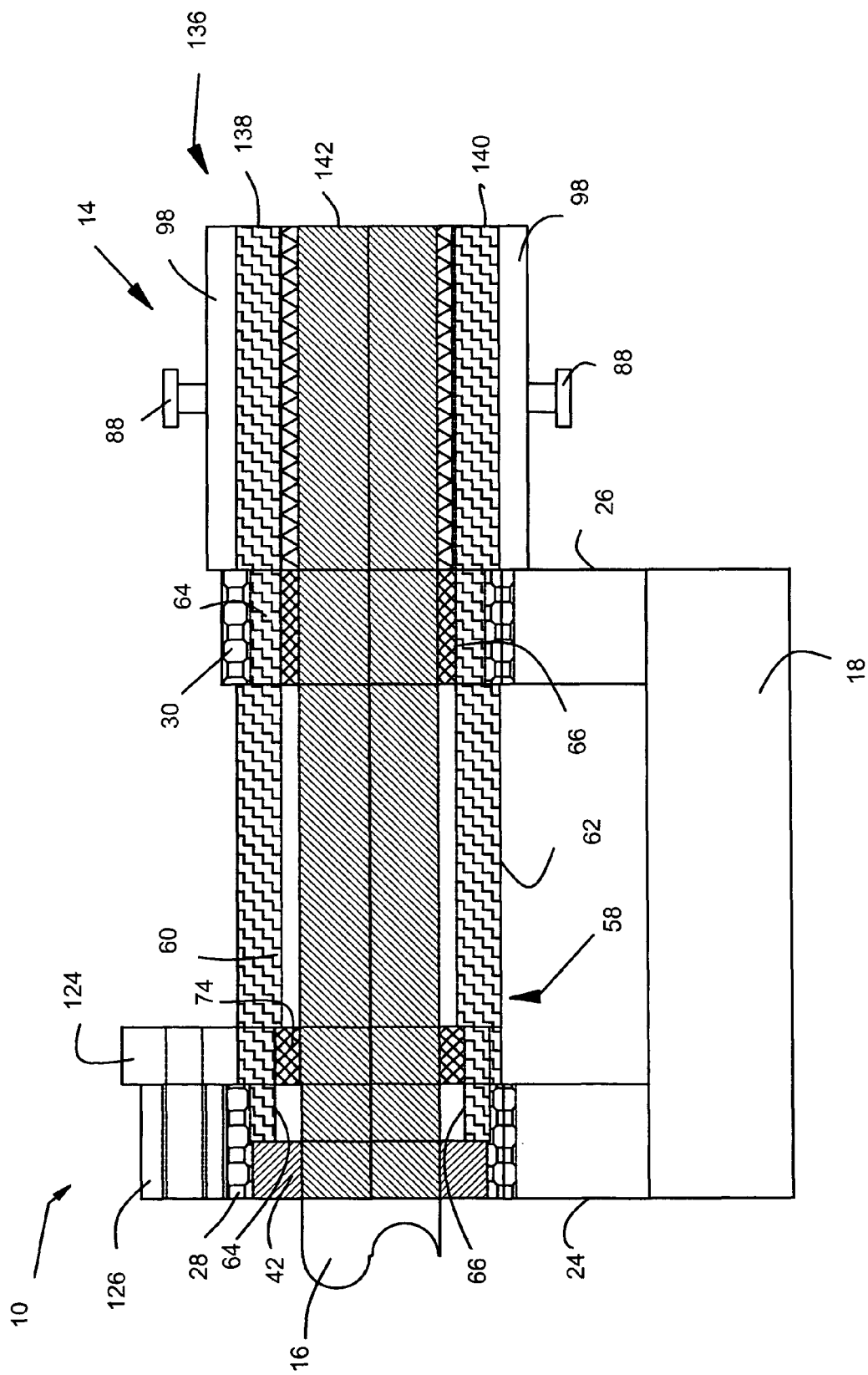
FIG. 3 is a view in side elevation of another embodiment of the scraper tool, illustrating a blade holder positioned for preparing the end of a polyethylene conduit

As shown in FIG. 1, the tool assembly 10 is located at a preselected location on the conduit where the desired electrofusion connection and repair is to be made. As illustrated in FIG. 3, the tool assembly 10 can be located on a polyethylene conduit to prepare the extreme end of the conduit 16 for electrofusion.

Figure 4:
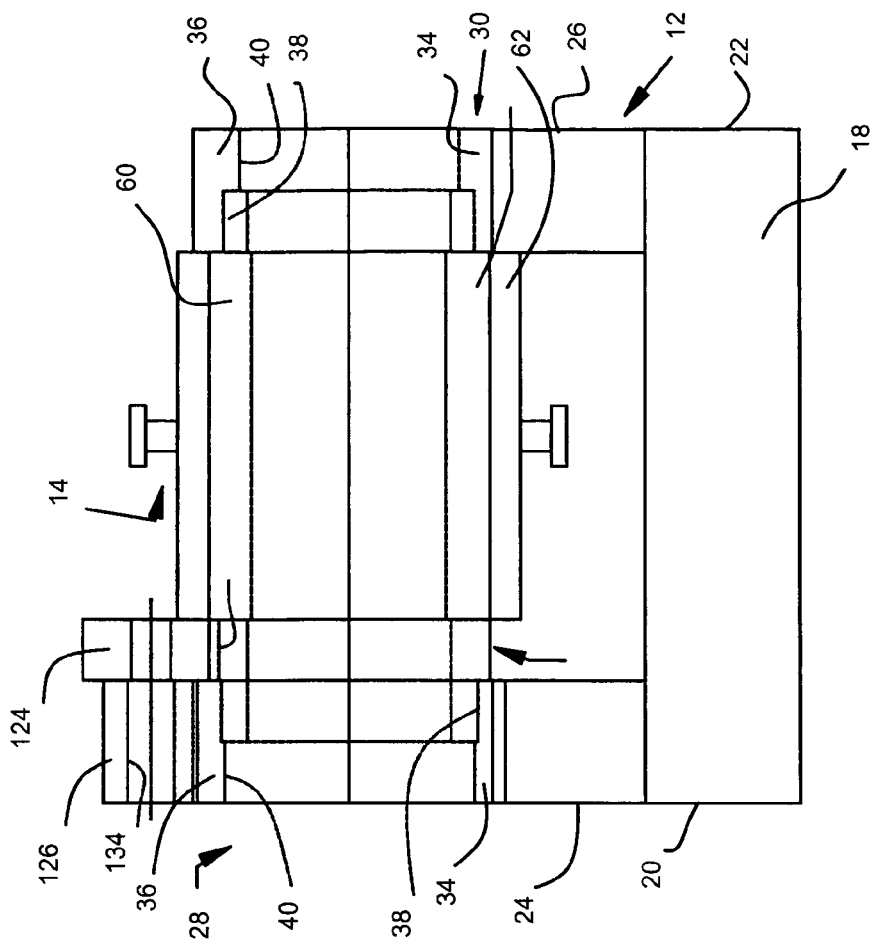
FIG. 4 is a view in side elevation of a stationary frame and rotatable housing of the scraper tool shown in FIG. 1 for supporting the cutting blade in contact with the polyethylene conduit.
Figure 5:
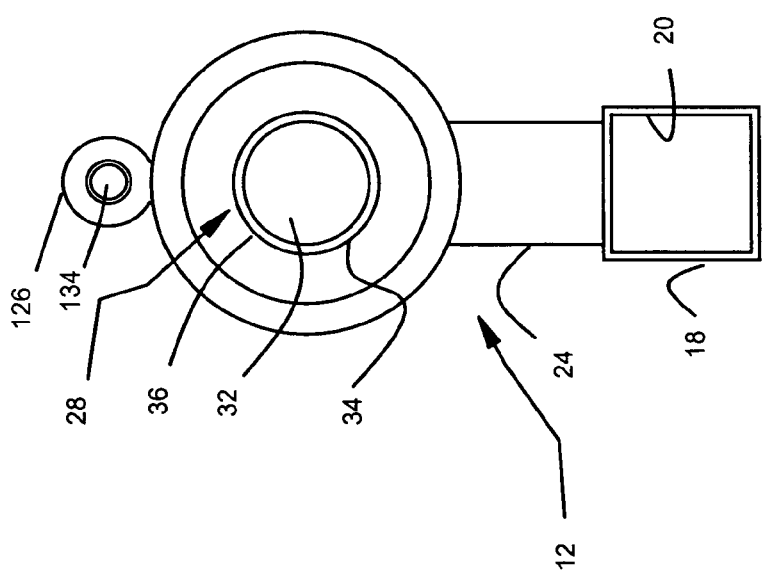
FIG. 5 is an end view of the frame and housing shown in FIG. 4.

Now referring to FIGS. 4 and 5 there is shown in greater detail the frame 12 for rotatably supporting the scraper assembly 14 to remove an oxidized layer of material from the surface of the conduit 16. The frame 12 includes a strut 18 that extends the length of the tool assembly and is a multi-sided member having a cross section of a selected configuration that may be either circular or rectangular, as shown in FIGS. 4 and 5. The strut member 18 has opposite end portions 20 and 22 that receive a pair of support blocks 24 and 26 respectively. The support blocks 24 and 26 are connected to the strut member end portions 20 and 22 by suitable connections, such as welding the blocks 24 and 26 to the end portions 20 and 22 or by bolting the end portions 20 and 22 to the blocks 24 and 26. For purposes of clarity, the connecting devices for the support blocks 24 and 26 to the strut member 18 are not shown in FIGS. 4 and 5.

Figure 6:
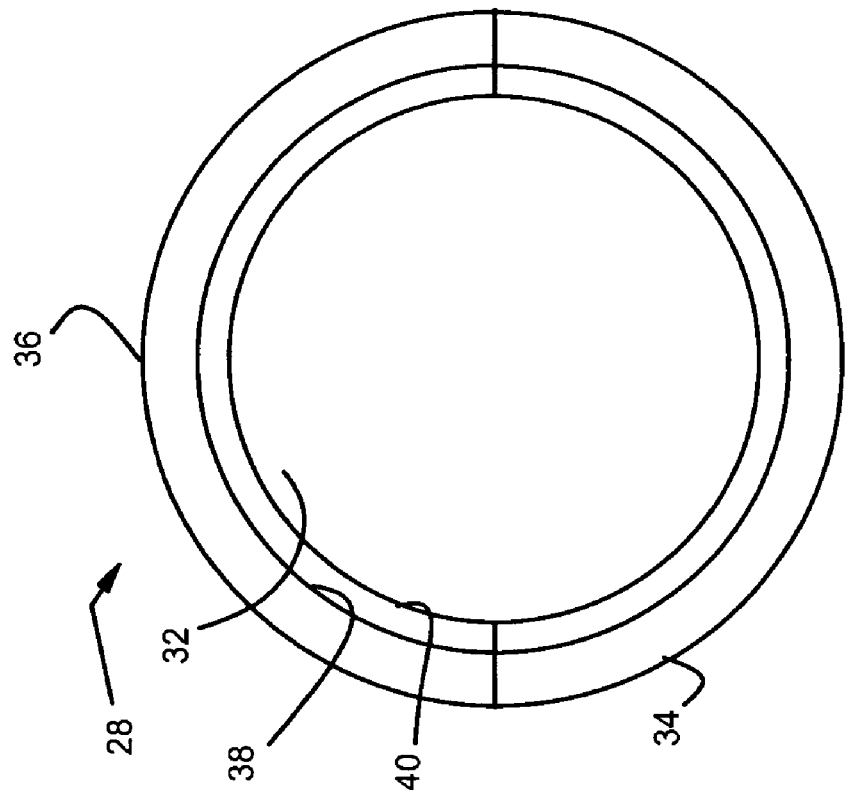
FIG. 6 is an end view of the housing for rotatably supporting the cutting blade, illustrating the split construction of the housing.
Figure 7:
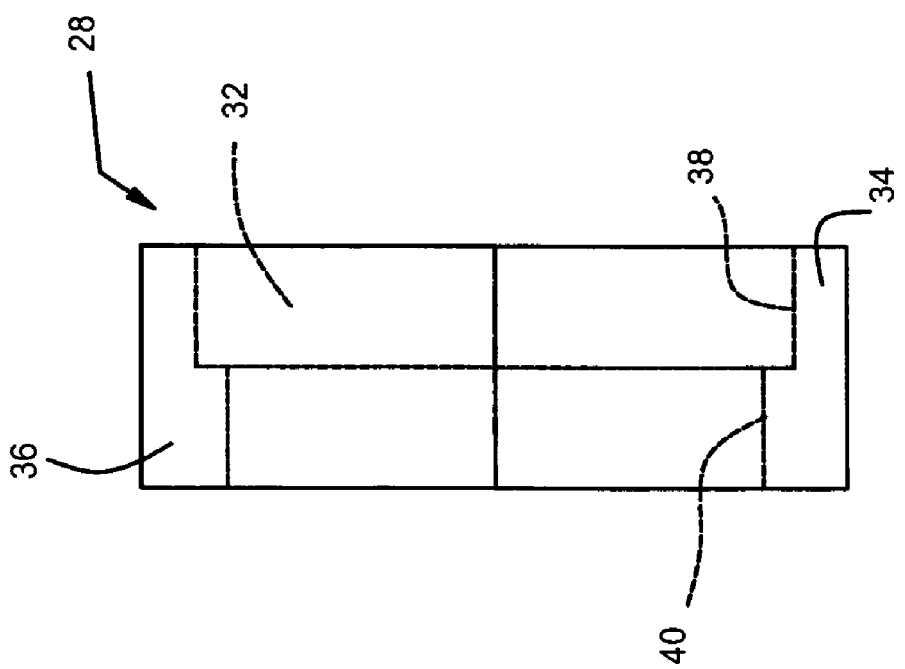
FIG. 7 is a view in side elevation of the housing shown in FIG. 6.

The support blocks 24 and 26 are rigidly mounted on the strut member 18 and extend upwardly therefrom to receive a pair of split bearing housings 28 and 30 respectively, positioned on opposite ends of the frame as shown in FIGS. 4 and 5. The bearing housings 28 and 30 are identical, and bearing housing 28, 30 is shown in FIGS. 6 and 7. Each bearing housing 28, 30 has a split cylindrical structure having a bore 32 extending through the housing. Each housing 28 and 30 as includes a first semicircular portion 34 and a second semicircular portion 36. The portions 34 and 36 are separable from one another and when positioned in abutting relationship, as shown in FIGS. 6 and 7, form an enlarged bore portion 38 and a reduced bore portion 40 or bore 32. As illustrated in FIGS. 1 and 2 and described below in greater detail, the reduced bore portion 40 of each bearing housing 28 and 30 is adapted to receive a split bearing clamp 42, shown in FIG. 10, for receiving the conduit 16 extending therethrough.

As illustrated in FIGS. 1 and 4, the semi-circular portion 34 of each bearing housing 28 and 30 is rigidly connected to the support blocks 24 and 26 that extend upwardly from the longitudinal strut 18. Preferably, the housing bearing portions 34 are welded to the upper surface of the support blocks 24 and 26 or connected by any other means. With this arrangement, the bearing housing portions 34 remain fixed to the support blocks 24 and 26 on the strut member 18, while the bearing housing portions 36 are movable into and out of position on the bearing housing portions 34.

The bearing housing portion 36 is removable from the bearing housing 34 to facilitate positioning of the split bearing clamp 42 in the bore portion 40. The split bearing clamp 42 is illustrated in detail in FIG. 10. Each bearing clamp 42 has a split construction, forming a first semicircular portion 44 and a second semicircular portion 46. Each semi-circular portion 44 and 46 is milled to form opposing surfaces 48 and 50 and bored to provide an axial bore 52 for receiving the polyethylene conduit 16. When the semicircular portions 44 and 46 are positioned within the housings 28 and 30 with the conduit 16 extending therethrough, the bearing housing semi-circular portions 34 and 36 are urged into compressive relation with the split bearing clamp 42 by nut and bolt combinations, not shown.

Preferably, to facilitate the positioning of the split bearing housings 28 and 30 on bearing clamps 42, bolts of extended length are used to allow their separation and movement into surrounding relation with the polyethylene conduit 16 in an underground environment. This arrangement is schematically illustrated in FIGS. 12 and 13 in which two pairs of elongated bolts 54 and 56 allow separation of the bearing housings 28 and 30 for positioning of the tool assembly 10 on the conduit 16. The components of the tool assembly 10 remain connected as it is lowered into position on the conduit 16. It should be understood that in one embodiment a pair of nut and bolt combinations are used to connect each semicircular portion 34 and 36 of both bearing housings 28 and 30.

Figure 8:
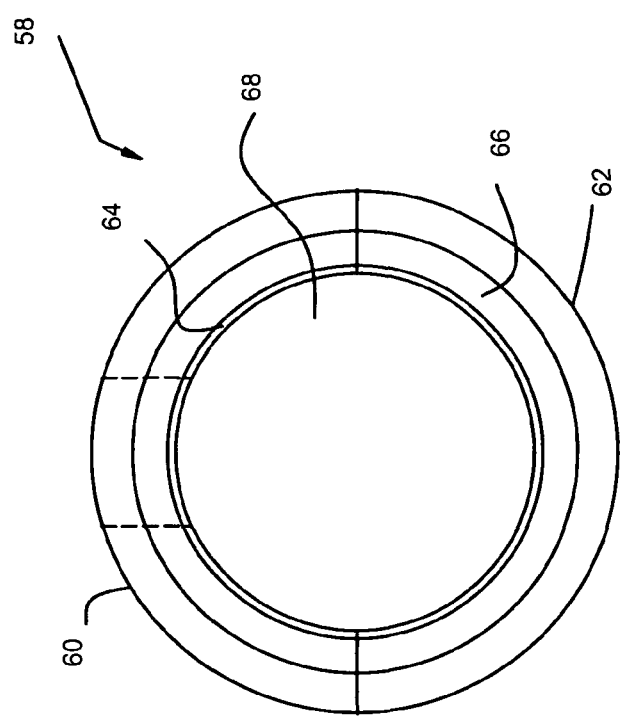
FIG. 8 is an end view of a split tube for rotatably supporting the cutting blade.
Figure 9:
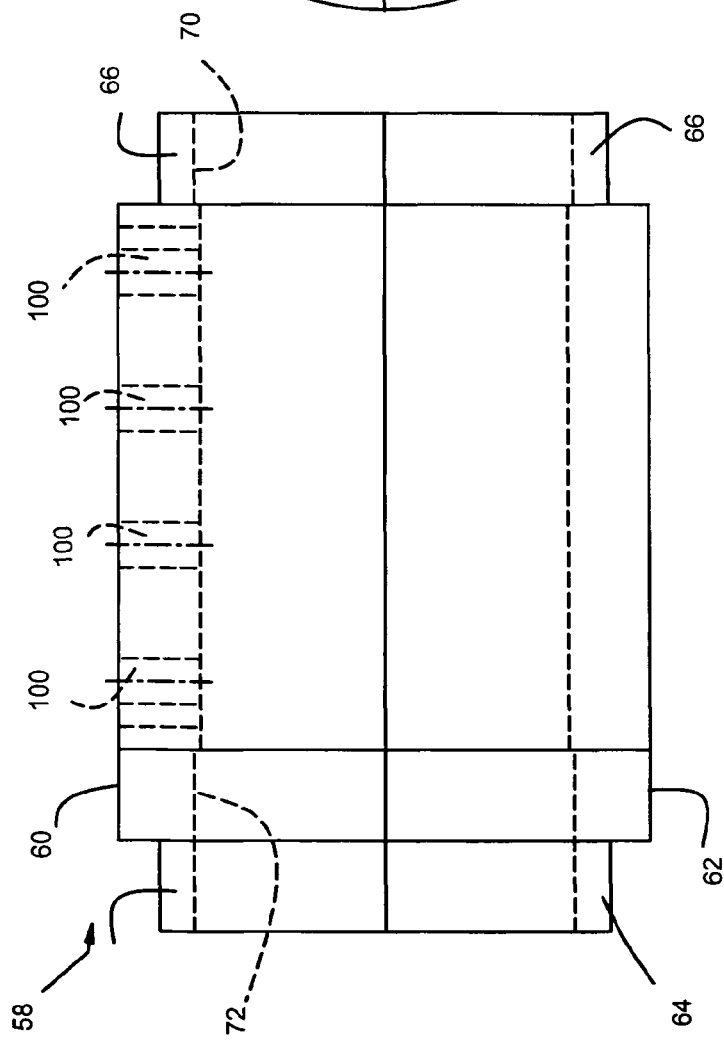
FIG. 9 is a view in side elevation of the split tube shown in FIG. 8.

The split bearing housings 28 and 30 are supported by a split tube generally designated by the numeral 58 in FIG. 1 and illustrated in detail in FIGS. 8 and 9. Each semi-circular portion 60 and 62 includes reduced end portions 64 and 66 that are received within the enlarged diameter portion 38 of each bearing housing 28 and 30 mounted on the conduit 16.

Figure 10:
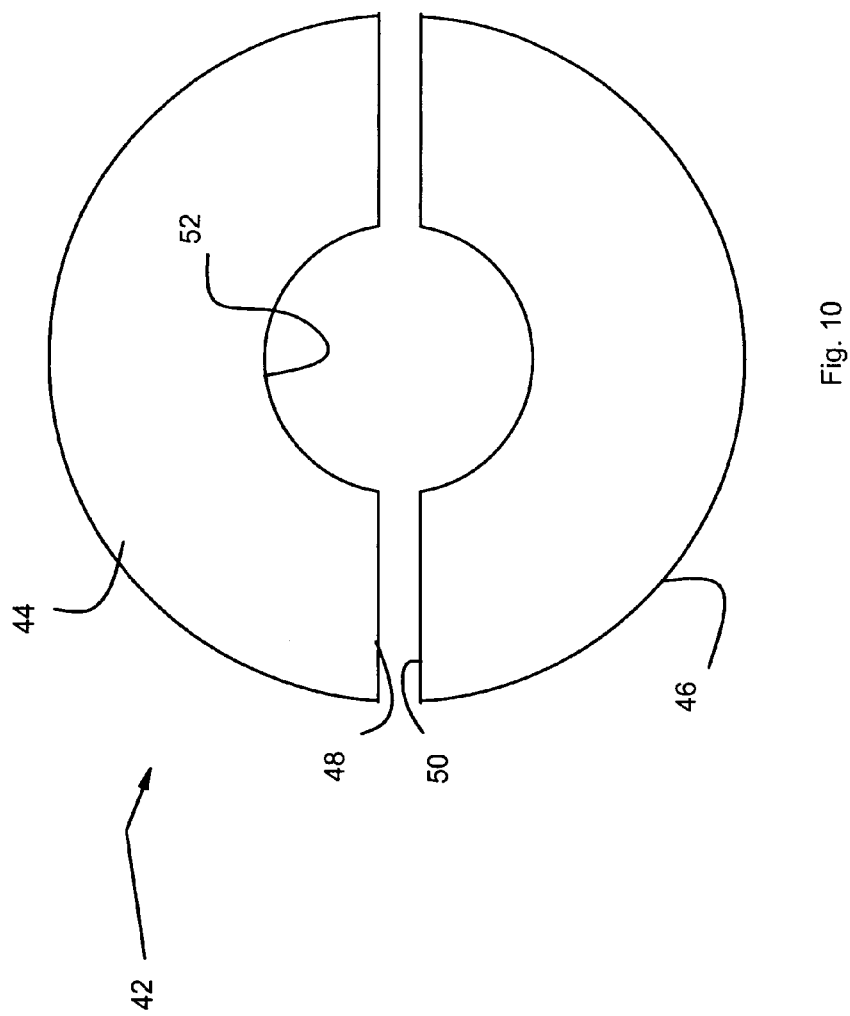
FIG. 10 is an end view of a split clamp for compressing the polyethylene conduit to remove out of roundness of the pipe.
Figure 11:
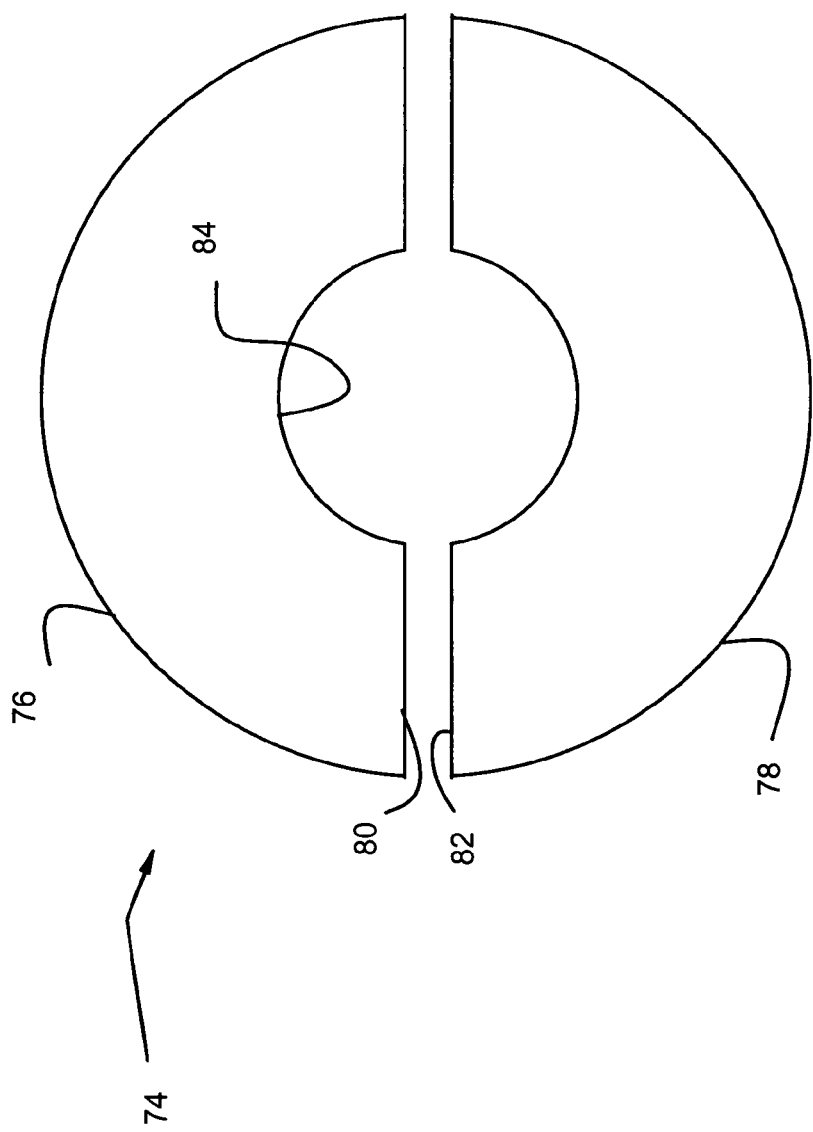
FIG. 11 is an end view of another split clamp for securing the conduit in a nonrotatable position for scraping.

As illustrated in FIGS. 8 and 9, the split tube 58, as also illustrated in FIG. 1, includes a through bore 68 having spaced apart portions 70 and 72 adapted to receive in surrounding relation a split bearing clamp 74, shown in FIG. 11. The bearing clamp 74 is similar in construction to the split bearing clamp 42 shown in FIG. 10. The split bearing clamp 74 also includes first and second semicircular portions 76 and 78 forming opposing surfaces 80 and 82 forming an axial bore 84 therethrough. With this arrangement, the split bearing clamp portions 76 and 78 are positioned within the bore portions 70 and 72 of the split tube 58 in surrounding relation with the polyethylene conduit.

As will be described greater in later detail, when the bearing housings 28 and 30 are securely bolted together on the polyethylene conduit 16, the axially spaced pairs of bearing clamps 42 (FIG. 10) and 74 (FIG. 11) are brought into compressive relation with the surface of the conduit 16. If the conduit 16 is out of round, as shown in FIG. 15, it is brought into round by the compressive force applied by the bearing clamp pairs 42 and 74. See FIG. 17 for bearing clamp 74.

More specifically, FIG. 15 illustrates the conduit 16 having an out of round configuration which has resulted due to the external forces acting on the conduit 16 buried in an underground environment for many years. Should the polyethylene conduit require repair, a uniform layer of material must be removed from the surface to provide positive electrofusion. The scraping operation will not be successful in uniformly removing a layer of material completely around the conduit 16, if the conduit is initially out of round. Oxidized material will remain on the conduit at the point where the electrofusion operation is to be formed, resulting in incomplete fusion and potential leakage.

For the electrofusion operation to be successfully performed, the conduit 16 must be restored to its original concentric configuration. In accordance with the present invention, the original shape of the conduit is restored by bringing the conduit into round or concentricity. This is accomplished by compressive forces applied to the out of round conduit 16 by the pairs of bearing clamps 42 and 74, as described above and illustrated in FIGS. 15-17.

For purposes of illustration, the split bearing clamp 74, as shown in FIG. 16, is initially positioned in clamped engagement around the conduit 16 when positioned within the split tube 58. When the split tube 58 is tightened into compressive relation with the conduit 16, the bearing clamp portions 76 and 78 (FIG. 16) are urged together until the opposing surfaces 80 and 82 are, brought into abutting relation, as illustrated in FIG. 17. Thus the polyethylene conduit 16 is compressed to restore its original concentric configuration.

When the concentricity of the conduit 16 is restored, the conduit can be successfully prepared for the electrofusion operation. A uniform thickness of oxidized material can be completely and uniformly removed around the entire circumference of the conduit 16. It should also be understood the pairs of split bearing clamps 42 also function within the bearing housings 28 and 30 to nonrotatably secure and align the conduit 16 in the tool assembly 10.

After the polyethylene conduit 16 has been reshaped to restore the roundness or concentricity to the surface of the conduit, the conduit is then prepared for the electrofusion process by removing a uniform layer of material from the outer surface of the conduit. In accordance with the present invention, the removal of material from the outer surface of the conduit is carried out by the scraper assembly 14, which is illustrated in detail in FIGS. 18-21. The scraper assembly 14 is mounted on and carried by the split tube 58 around the polyethylene conduit 16. As described above, the split tube 58 is rotatably supported at its end portions 64 on the split bearing clamps 74. With this arrangement the split tube 58 rotates on the stationary frame 12 around the conduit 16.

Figure 19:
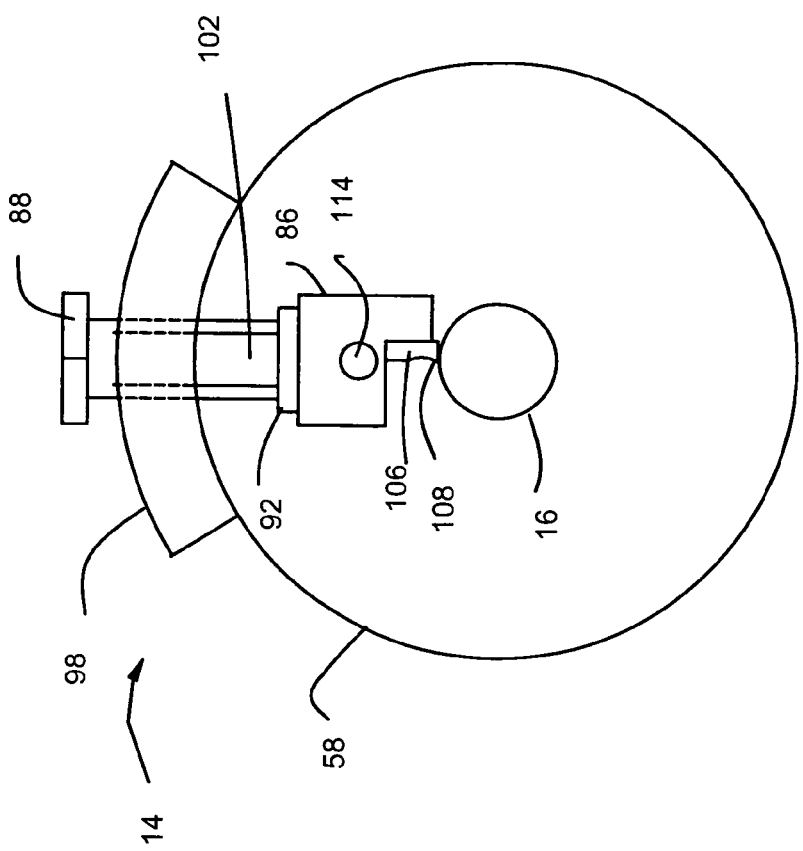
FIG. 19 is a schematic end view similar to FIG. 18 of the scraper tool, illustrating the cutting blade in contact with the surface of the conduit.
Figure 18:
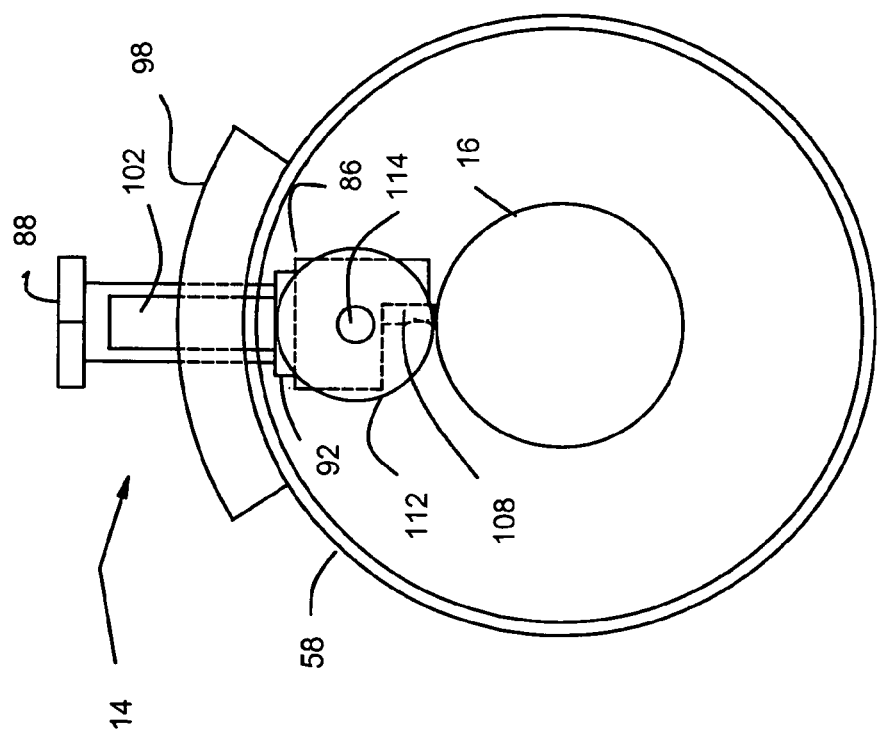
FIG. 18 is a schematic end view of the cutting blade of the scraper tool positioned in contact with the conduit for removing a layer of material from the surface of the conduit.

Referring to FIGS. 18 and 19, there is schematically illustrated the scraper assembly 14 mounted on the split tube 58 between the split bearing clamps 74 (See FIG. 1). The scraper assembly 14 is retained in a fixed longitudinal position relative to the surface of the conduit 16 by the connection of the scraper assembly 14 to the split tube 58. The scraper assembly 14 does not move longitudinally on the conduit 16 during the scraping operation, but it rotates with the split tube 58 around the conduit 16. Further, the scraper assembly 14 is also movable radially on the split tube 58 to accommodate a range of conduit diameters. For example as shown in FIG. 18, the scraper assembly 14 has been moved radially outward for positioning on a larger diameter conduit 16. As shown in FIG. 19, the scraper assembly 14 has been moved radially inward from the position shown in FIG. 18 to engage a smaller diameter conduit.

Referring to FIGS. 20 and 21, there is schematically illustrated the scraper tool assembly 14 removed from its mounting on the split tube 58, as shown in FIGS. 18 and 19. The scraper assembly 14 includes a blade holder 86 connected to the lower end portion of a drive screw 88. As shown in FIG. 20, drive screw 88 includes a lower end portion 90 received within a socket of the blade holder 86. A retainer plate 92 is connected to the blade holder 86 and engages the lower end of the drive screw to prevent separation of the drive screw 88 from the blade holder 86.

The drive screw 88 has a threaded shaft 94 received within a threaded bore 96 of a retainer plate 98. The retainer plate 98 is bolted to the surface of the split tube 58 around a longitudinal slot (not shown) in the split tube 58 to allow the blade holder 86 to pass downwardly through the split tube 58 into position adjacent to the surface of the conduit 16. As seen in FIGS. 18 and 19, the retaining plate 98 has an arcuate configuration that conforms to the circumference of the split tube 58. With this arrangement the retaining plate 98 is supported by the split tube 58. The retaining plate 98 is bolted to the surface of the split tube. The bolts are not shown; however, bolt holes 100 in the split tube 58 for receiving the bolts are illustrated in FIG. 9. With this arrangement the blade holder 86 is dropped through a slot in the surface of the split tube 58, and the retaining plate 98 is bolted to the split tube 58 so that it rotates with the split tube 58.

With the scraper assembly 14 supported by the retaining plate 98 on the split tube 58, rotation of the drive screw 88 radially advances the blade holder 86 toward and away from the surface of the conduit 16. Relative positioning of the blade holder to engage different sizes of conduit 16 is illustrated in FIGS. 18 and 19. The blade holder 86 is fixed in longitudinal position relative to the surface of the conduit 16 so that movement of the blade holder 86 is limited to radial movement. The blade holder 86 is also connected to a pair of guide rails 102 shown in FIGS. 20 and 21. The guide rails 102 are press fit at lower end portions into bores of the blade holder 86. Bushings in bores 104 of the retaining plate 98 support the guide rails 102 for movement in a radial direction toward and away from the surface of the conduit 16. With this arrangement rotation of the drive screw 88 advances the blade holder 86 radially relative to the conduit 16 guided by movement of the rails 102 on the retaining plate 98.

Figure 22:
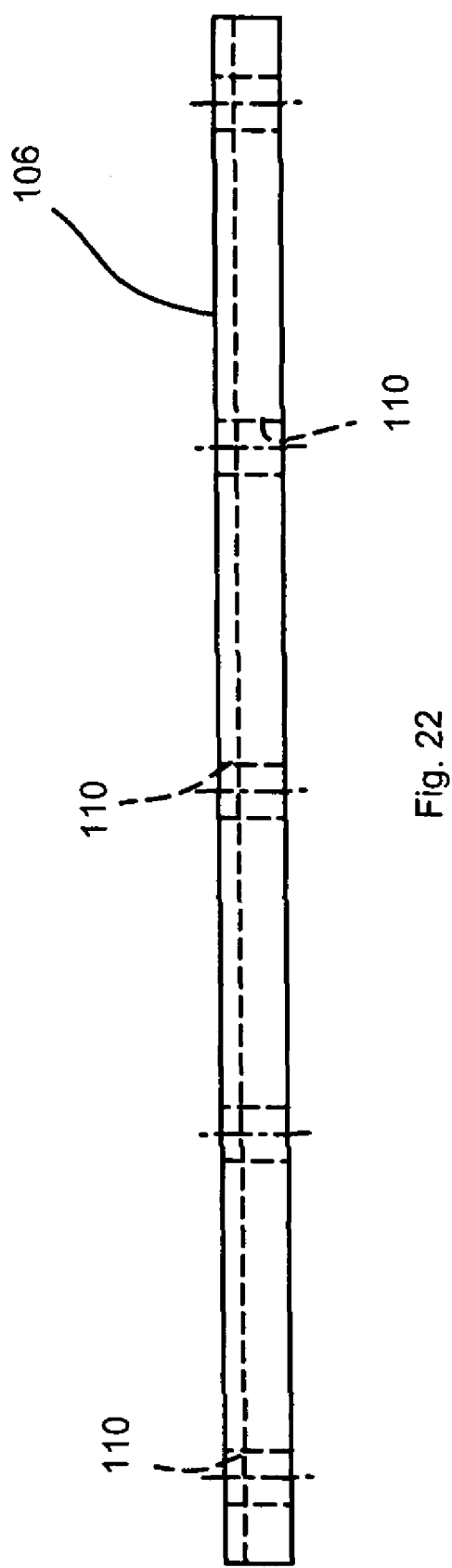
FIG. 22 is a view in side elevation of the cutting blade shown in FIG. 21.

As seen in FIGS. 18-21, blade holder 86 supports a blade 106 longitudinally adjacent to the surface of the cylinder 16. The blade 106 is shown removed from the blade holder 86 in FIG. 22. The blade 106 has a cutting edge 108 that extends the length of the blade and is movable into cutting engagement with the surface of the conduit 16. Accordingly, rotation of the drive screw 88 advances the blade cutting edge 108 to a pre-select position relative to the surface of the conduit 16 for removing a selected amount of material from the surface of the conduit 16. The blade 106 is connected to the blade holder 86 by screws extending through bores 110 (FIG. 22) of the blade 106 into the body of the blade holder 86.

The depth of cut by the blade cutting edge 108 into the surface of the polyethylene conduit 16 is controlled by a pair of wheels 112 that are rotatably supported by bearings (not shown) on stub shafts 114 that extend outwardly from opposite ends of the blade holder 86, as shown in FIGS. 20 and 21. FIG. 20 illustrates the position of the blade edge 108 relative to the periphery of the wheels 112. FIG. 18 illustrates the position of the blade cutting edge 108 and the surface of the control wheel 112 relative to the surface of the conduit 16. For purposes of illustration, the control wheel 112 is removed from the stub shaft 114 in FIGS. 19 and 21. While the radial position of the blade cutting edge 108 is adjusted to increase or decrease the amount of material removed from the surface of the conduit 16, the presence of the control wheels 112 prevents the blade edge 108 from extending into the conduit 16 beyond the point where the wheels 112 move into contact with the surface of the conduit 16. Contact of the wheels 112 with the surface of the conduit 16 presents further removal of material by the blade 106.

Figure 23:
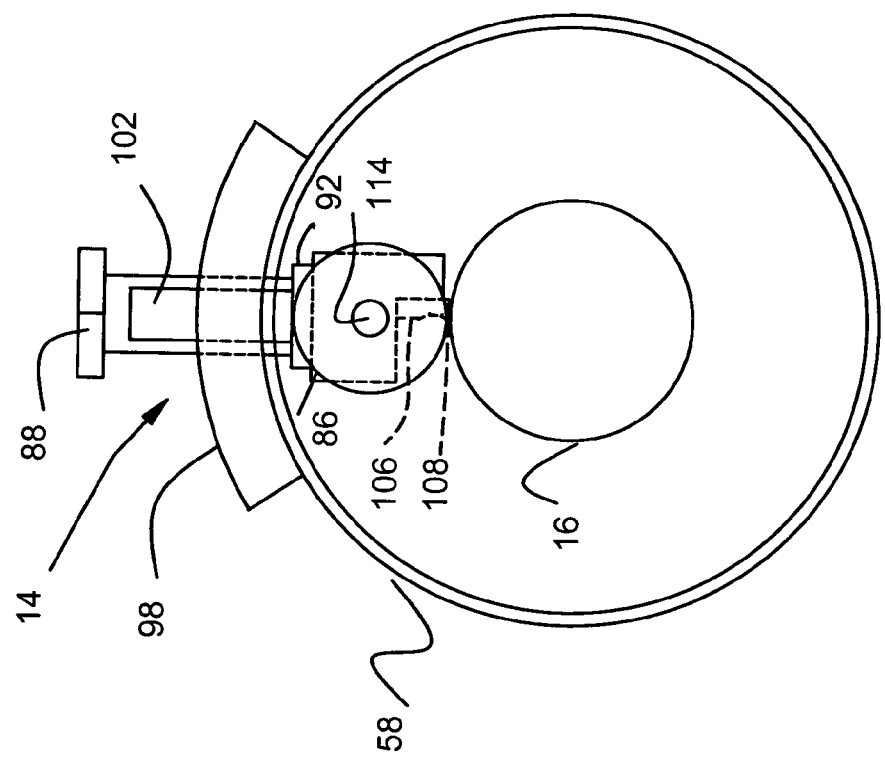
FIG. 23 is a schematic end view of the blade holder, illustrating the cutting blade supported in a radial position relative to the surface of the polyethylene conduit.
Figure 24:
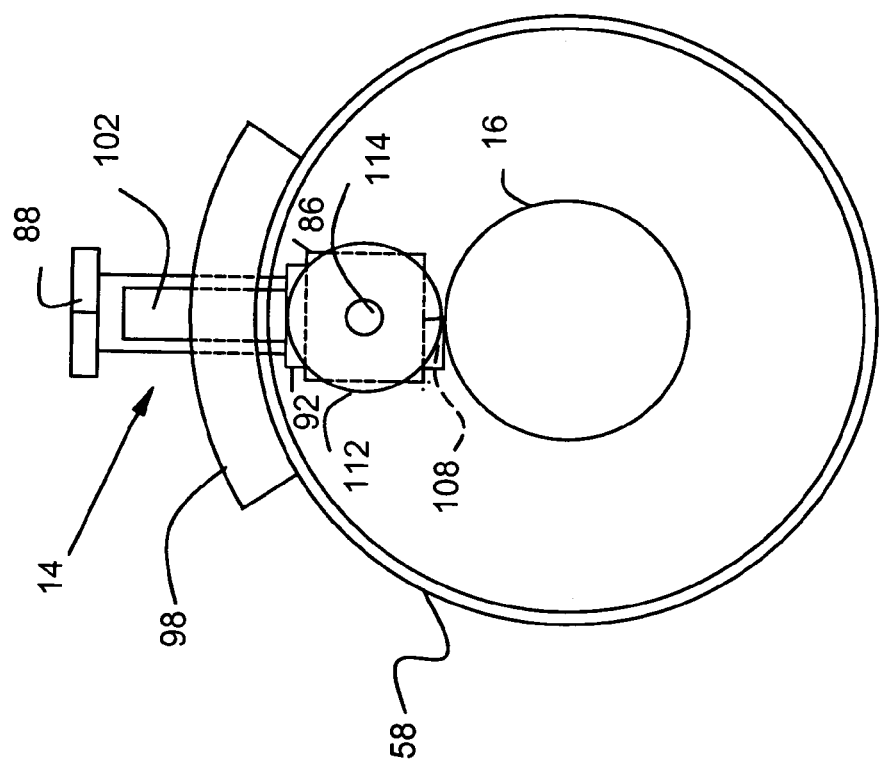
FIG. 24 is a view similar to FIG. 23, illustrating the cutting blade supported in a tangential position relative to the surface of the polyethylene pipe.

Now referring to FIGS. 23 and 24, there is illustrated the arrangement for positioning the cutting blade to scrape the surface of the conduit 16. Radial positioning of the blade cutting edge 108 on the surface of the conduit 16 is shown in FIG. 23. Tangential positioning of the blade cutting edge 108 on the surface of the conduit 16 is shown in FIG. 24. As also shown in FIGS. 18 and 19, the blade cutting edge 108 is positioned on the holder 86 to advance radially into cutting relation with the surface of the conduit 16. The depth at which the cutting edge 108 extends into the surface of the cylinder is controlled by rotation of the drive screw 88. However, the presence of the control wheels 112 prevents excessive amounts of material from being removed from the cylinder 16 by the blade 106.

With the arrangement shown in FIG. 24, the blade holder 86 is positioned on the end of the drive screw 88 so that the blade cutting edge 108 is positioned tangentially relative to the surface of the conduit 16 for removing material therefrom. With either arrangement as shown in FIGS. 23 and 24, the amount of material removed from the cylinder 16 is controlled by the wheels 112.

Figure 25:
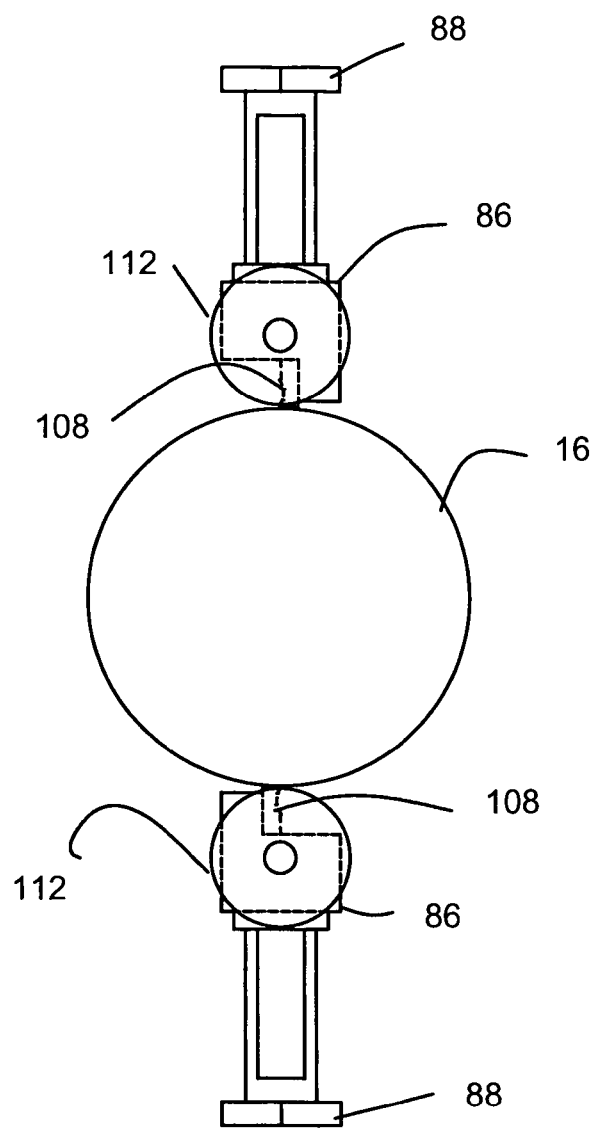
FIG. 25 is a schematic illustration of a pair of cutting blades in diametrically opposed radial position for cutting the surface of the polyethylene conduit.
Figure 26:
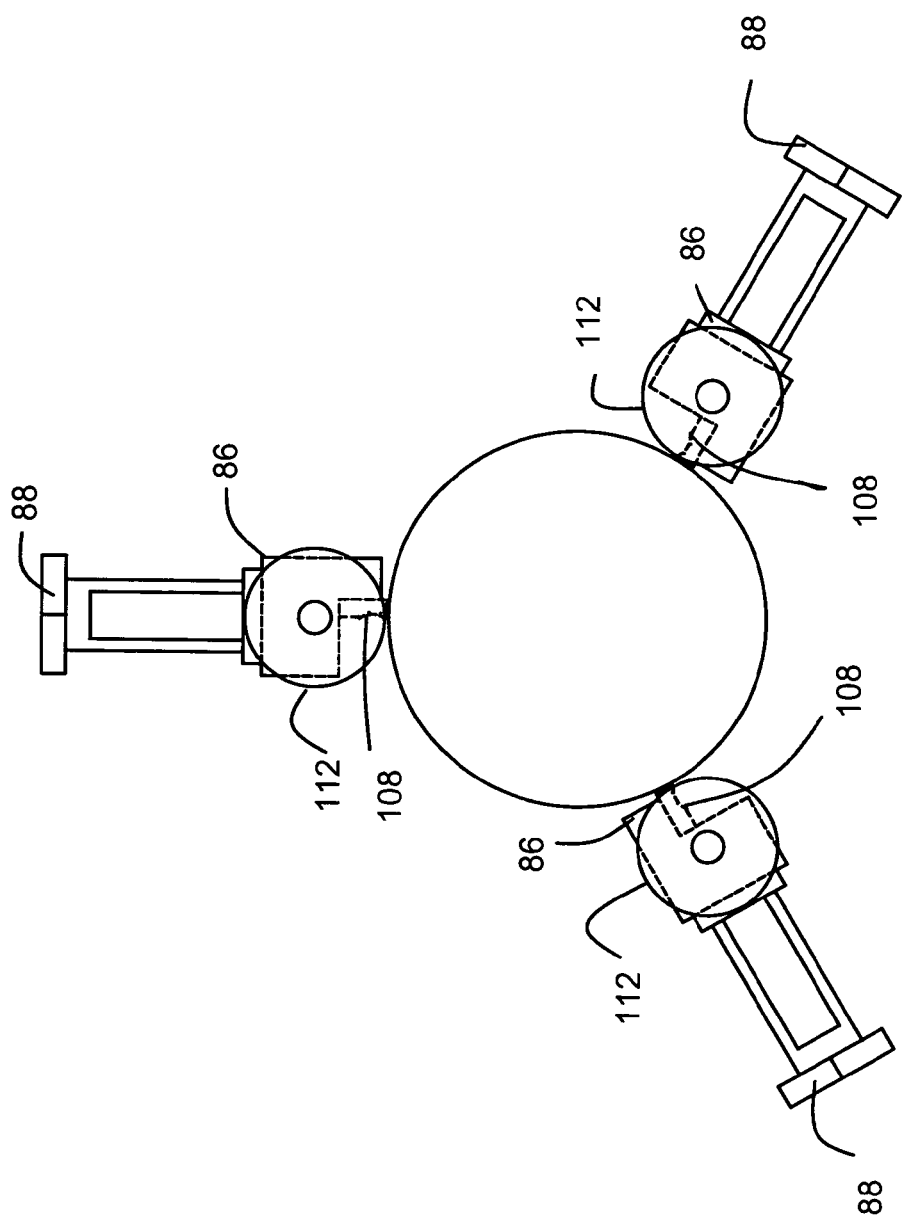
FIG. 26 is a view similar to FIG. 25 of a three blade arrangement for scraping the surface of the polyethylene conduit.

Now referring to FIGS. 25-27, there is illustrated examples of multiple blade holders 86 for positioning a plurality of cutting blades 106 on the surface of the conduit 16 for removing a layer of material from the surface. With the arrangement shown in FIG. 25, a pair of blade holders 86 are diametrically positioned on the surface of the conduit 16. Each of the blade holders 86 includes a blade cutting edge 108 that extends horizontally a preselected length on the surface of the cylinder 16. Each of the blade holders 86 is independently controlled for radial movement toward and away from the surface of the conduit 16 to selectively position the blade cutting edge 108 on the surface of the conduit 16.

Each of the blade holders 86 is mounted on the end of a drive screw 88 that is rotatably supported within the retaining plate 98, as described above and illustrated in detail in FIGS. 20 and 21. As above described, the retaining plate 98 is bolted to the split tube 58 that rotates about the longitudinal axis of the cylinder 16. The retaining plates 98 are selectively radially positioned on the split tube 58. With the arrangement, the retaining plates 98 are mounted on the split tube 58 so that the blade cutting edges 106 are diametrically opposed, as shown in FIG. 25. This arrangement of diametrically opposed cutting blades 106 is also illustrated in FIGS. 1 and 4. By diametrically positioning cutting blades 106 the force required to remove a layer of material from the surface of the conduit 16 is reduced from that required for a single cutting blade arrangement, as shown in FIGS. 23 and 24.

Referring to FIG. 26, there is illustrated a three blade arrangement of blade holders 86 radially positioned around the periphery of the conduit 16. As with the diametrical arrangement of blade holders 86 as shown in FIG. 25, the arrangement shown in FIG. 26 also includes blade holders mounted on the end of a drive screw 88 supported by a retaining plate 98 (not shown) on surface of the split tube 58. Each of the blade cutting edges 106 is independently movable radially into position opposite the surface of the conduit 16.

Upon rotation of the split tube 58, the blade holders 86 rotate around the circumference of the conduit 16. As the blade holders 86 rotate the blade cutting edge 108 engages the surface of the conduit 16 to remove a layer of oxidized material. Each of the blade holders 86 includes control wheels 112 that limit the degree of penetration of the blade cutting edge 108 into the surface of the conduit 16 to prevent an undesirable amount of material from being removed from the surface of the conduit 16.

Now referring to FIG. 27, there is illustrated a four blade arrangement of blade holders 86 positioned in radial spaced relation on the circumference of the conduit 16. Each of the blade holders 86 is supported by retaining plates 98 on the surface of the split tube 58. As with the above-described arrangements, rotation imparted to the split tube 58 advances the blade cutting edges 108 into contact with engagement with the surface of the conduit 16 to remove a selected thickness of material from the surface of the conduit 16. The control wheels 112 prevent an excessive amount of material from being removed from the surface of the conduit 16 by the blade cutting edges 108.

In operation as illustrated in FIGS. 12-14, the tool assembly at 10 of the present invention is preferably used in keyhole technology operations to prepare the surface of underground polyethylene gas lines for repair by electrofusion. By utilizing keyhole technology, repair of underground polyethylene conduit can be carried out through the smallest possible ground level opening to minimize the damage and need to repair the pavement on the upper surface. By utilizing keyhole technology, the repair is controlled above ground.

As shown in FIG. 12, the keyhole operation is initiated by cutting the smallest ground level opening 116 through pavement 118. It is well known in the art to use high pressure water cutting tools to rapidly core out the keyhole opening 116 through the pavement 118. In one example, the opening 116 may be 18 inches or less in diameter. Below the pavement the excavation can fan out, and earthen material 120 is removed by vacuum equipment to expose a selected length of the underground polyethylene conduit 16. In a case of repairing a leak or installing additional equipment, the conduit 16 must be prepared for the electrofusion process by which a sleeve, coupling, or fitting is welded or fused to the existing polyethylene conduit 16.

Before the electrofusion process is carried out the pipe surface must be prepared to remove dirt and/or oxidation of the pipe so that the connecting piece can be welded to the pipe to prevent leakage. With the tool assembly 10 of the present invention, the surface of the pipe is first reshaped to remove any out of roundness that has taken place in the conduit. This is essential to uniformly and completely remove oxidized layers from the surface of the conduit so an oxide free surface is provided for carrying out a leak-free electrofusion operation.

Most importantly, before the scraping operation is conducted any out of roundness in the pipe must be corrected to restore concentricity of the pipe. If the pipe remains out of round during the scraping operation, the scraping operation will not be uniform. Consequently, dirt and oxidation will remain on the surface of the conduit, preventing complete fusion of a coupling or fitting which eventually can result in leakage and further damage.

After the keyhole opening 116 is cut in the pavement, earthen material is evacuated from around the area of the conduit 16 where the scraping operation is to be performed. As shown in FIG. 12, the tool assembly 10 is lowered through the keyhole opening 116 in the pavement 118 into the excavated area in formation 120. An extension rod 122 is releasably connected at a lower end portion 124 to the semicircular portion 60 of the split tube 58 that is shown in detail in FIG. 4. The connection of the tube end portion 124 to the split tube portion 60 may be any mechanism that permits remote connection and disconnection. To facilitate positioning of the tool assembly 10 on the conduit 16, the semicircular portions 60 and 62 of the split tube are spaced apart by the provision of the elongated bolts 54 and 56 that connect the two portions 60 and 62. The portions 60 and 62 are positioned at opposite ends of the extended bolts 54 and 56 to allow sufficient space therebetween to permit lowering of the assembly 10 onto the conduit 16 as shown in FIG. 12. In the position shown in FIG. 13 where the split tube upper portion 60 rests on the conduit 16 with the tube lower portion 62 suspended below the conduit 16 on the elongated bolts 54 and 56.

Once the tool assembly 10 is lowered into position on the conduit 16, the extension rod 122 is removed from connection to the split tube portion 60. Using a suitable torque wrench, the pairs of bolts 54 and 56 are tightened to draw the split tube portion 62 into a compressive relation with the split tube portion 60 to complete the mounting of the tool assembly 10 on the conduit 16, as shown in FIG. 14. Any conventional torque wrench can be used to tighten the elongated bolts 54 and 56 on the tube portions 60 and 62.

Preselected torque is applied to the bolts 54 and 56 to draw the tube portions 60 and 62 into compressive relation with the conduit 16 so that the pairs of split bearing clamps 42 and 74, as shown in FIG. 1, are compressed on the surface of the conduit 16. Preferably the clamp pairs 42 when tightened on the conduit 16 serve to stabilize the conduit 16 within the tool assembly. The inner pair of bearing clamps 74 when compressed serve to resize and reshape the conduit 16 so that if the conduit is out of round it is brought into round and concentricity is restored to the surface of the pipe 16 preliminary to the scraping operation. The reshaping of the conduit 16 by the provision of the pairs of split bearing clamps 74 is shown in detail in FIGS. 15-17 and discussed above.

After an out of round conduit 16 has been reshaped, the conduit is ready for the scraping operation. The scraping operation is carried out by rotation of the split tube 58 within the stationary bearing housings 28 and 30. As described above, rotation of the split tube 58 carries the scraper assembly 14 completely around the circumference of the pipe 16 through 360°. In the rotation of the scraper assembly 14, the blade 106 removes a layer of material from the surface of the conduit the complete length of the blade 106. No longitudinal movement of the blade 106 is required.

Rotation of the split tube 58 and the scraper assembly 14 is carried out by any suitable drive mechanism. In one example, the drive mechanism for rotating the split tube 58 within the bearing housings 28 and 30 is carried out, as illustrated in FIGS. 1 and 2, by a pinion 124 rotatably supported in a housing 126 secured to the semicircular portion of the bearing housing 28. As shown in FIG. 4 gear teeth of pinion 124 mesh with gear teeth 128 cut on the outer surface of the semicircular portions 34 and 36 of the bearing housing 28.

Rotation is transmitted from the pinion 124 to the meshing teeth to the split tube 58 by torque applied by an extension wrench 130 as illustrated in FIG. 14. The extension wrench 130 is lowered down through the keyhole opening 116 into driving engagement at the lower end portion 132 to a shaft 134 of pinion 124. As shown in FIG. 4, the shaft 134 is rotatably supported within the housing 126 on the split tube upper portion 36. With this drive arrangement the blade holder 86 on the scraper assembly 14, together with the cutting blade 106, rotates around the polyethylene conduit 16 to remove a layer of material from the conduit so that an oxide free surface is exposed for the electrofusion operation. The layer of material is uniformly removed to a preselected thickness, as controlled by the wheels 112 on the blade holder 86 described above.

Also in accordance with the present invention, other suitable drive mechanisms are employed to transmit rotation to the scraper assembly 14. In one embodiment, rotation is transmitted by a conventional chain drive mounted on the split tube 58. Another suitable drive means used with the present invention is a V-belt connection with a source of rotation to the split tube 58. Therefore, it should be understood that the rotation transmission means to the scraper assembly 14 is not limited to the meshing arrangement of the pinion 124 with gear teeth 128 cut into the surface of the split tube 58.

As shown in FIG. 25, the scraper assembly 14 includes a pair of blade holders 86 positioned in diametrically opposed relation on the conduit 16 for scraping. This arrangement is also shown in FIG. 1. With this arrangement, the conduit 16 is scraped at a desired location along the length of the conduit. In those instances in which the end of the conduit 16 is scraped, the tool assembly 10 is mounted on the end of the conduit 16, as illustrated in FIG. 3. With this arrangement, the split tube 58 includes an extension 136. It also includes first and second semicircular portion 138 and 140 that are held together in compressive relation around the conduit 16. The tube extension 136 surrounds an enlarged split bearing clamp 42 having semi circular portions 44 and 46, as described above for the embodiment of the bearing clamp 42 as shown in FIGS. 1 and 10. The scraper assembly 14 is supported on the split tube extension 136 in the same manner as above described.

With the arrangement shown in FIG. 3, a pair of cutting blades 106 are mounted in diametrically opposed relation on the conduit end portion 142 to remove a layer of material from the conduit end portion. The manner in which the material is removed from the end of the conduit 16 by the cutting blades is the same as described above for the blade holder 86 and cutting blade 106 shown in FIGS. 18 and 19

Referring to FIGS. 28-30, there is illustrated a further embodiment of a scraper tool assembly generally designated by the numeral 144 for preparing the surface of polyethylene conduit used in underground natural gas and water pipelines and fluid conduits for repair by an electrofusion process. As illustrated in FIGS. 37A-37F, the scraper tool assembly 144 prepares the surface of a polyethylene conduit 146 by restoring roundness of the conduit and removing dirt and/or oxidation from the surface of the conduit so that a valve/clamping tool, sleeve, coupling or the like can be welded by electrofusion to the polyethylene conduit.

A stationary drive frame generally designated by the numeral 148 in FIG. 30 rotatably supports a cylindrical housing 150 which in turn supports the scraper tool assembly 144 in surrounding relation with the conduit 146, as shown in FIG. 36. The scraper assembly 144 is held by the frame 12 in a fixed longitudinal position for rotation around the surface of the polyethylene conduit or pipe 146. The conduit 146 extends through the scraper tool assembly 144 and is surrounded by the frame 148.

As with the embodiment shown in FIG. 1, the scraper tool assembly 144 shown in FIGS. 28 and 29 is rotatably supported at a preselected location on the conduit 146 by the frame 148 where the desired electrofusion connection and repair is to be made. The frame 148 is shown in detail in FIG. 30 and is constructed of a pair of Y-shaped plates 152 positioned in closely spaced overlying relation. For purposes of clarity of illustration only a single plate 152 is shown in FIG. 30 and in FIGS. 35, 36, 37E and 37F. The pair of plates 152 are connected in overlying spaced relation by bolts (not shown).

Sandwiched between the pair of plates 152 of frame 148 is a drive gear 154 and a pair of idler gears 156. Drive gear 154 is nonrotatably mounted on shaft 158 which is rotatably supported by a bearing (not shown) within the plates 152. Similarly idler gears 156 are nonrotatably mounted on shafts 160 supported by bearings (not shown) within the plates 152.

The drive gear 154 is rotated by any suitable drive mechanism within the frame 148 to rotate the scraper tool assembly 144 around the surface of the conduit 146 to remove a layer of material from the surface of the conduit the length of the scraper tool assembly 144 completely around the conduit 146. In one embodiment torque is applied to shaft 158 of drive gear 154 by a torque wrench (not shown) having a driver that engages the end of shaft 158.

In one example, the extension wrench 130, illustrated in FIG. 14, is connected to the frame 148 and lowered down through a keyhole opening in an earthen formation to position the frame 148 in driving engagement with the scraper tool assembly 144 mounted on conduit 146, a shown in FIG. 36. As will be explained later in greater detail, the idler gears 156 rotatably support the tool assembly 144 on conduit 146 as rotation is transmitted from the driver of the torque wrench to drive shaft 158 of drive gear 154 rotatably supported by the pair of plates 152 of frame 148. In this manner the scrapper tool assembly 144 rotates around the polyethylene conduit 146 to remove a layer of material from the conduit so that an oxide free surface is exposed for the electrofusion operation. In accordance with the present invention, other suitable drive mechanisms are employed to transmit rotation to the scraper tool assembly 144.

Figure 32:
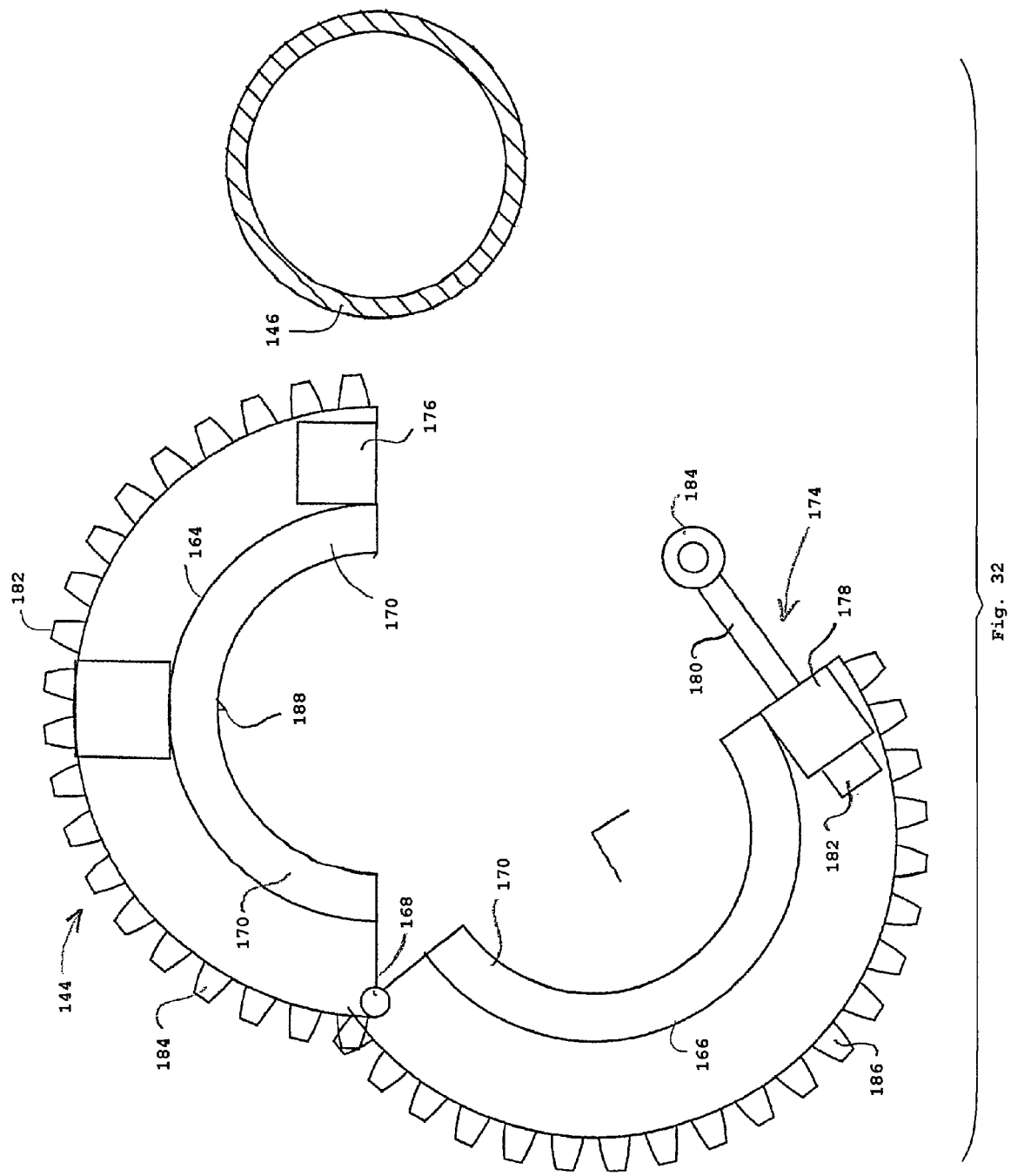
FIG. 32 is a view similar to FIG. 31, illustrating the split housing of the scraper tool pivoted to an open position to receive the conduit.
Figure 33:
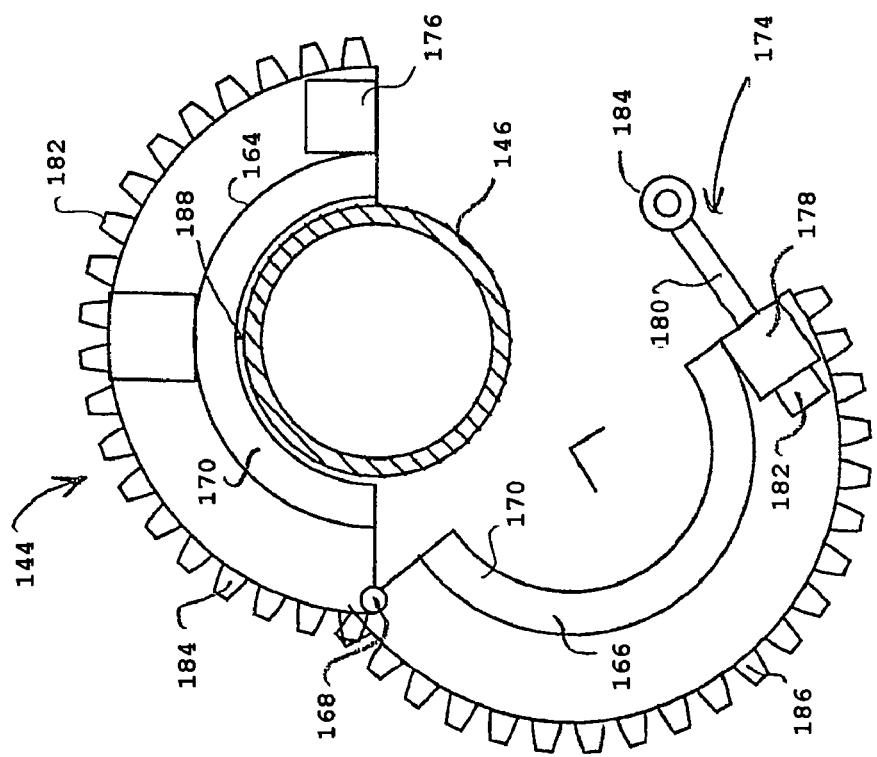
FIG. 33 is a view inside elevation of the scraper tool shown in FIG. 28, illustrating the split housing pivoted to an open position for receiving the conduit for scraping.

Now referring to FIGS. 28-32, there is illustrated the scrapper tool assembly 144 that is formed by a split tube assembly generally designated by the numeral 162 formed by semicircular portions or clamps 164 and 166. The clamps 164 and 166 are pivotally connected by a pin 168 for relative movement into and out of clamping engagement with the conduit 146. With the pivotal connection, the clamps 164 and 166 are movable between an open position to receive conduit 146, as shown in FIG. 33, and a closed position to engage conduit 146, as shown in FIG. 34, for the scraping operation.

Each clamp 164 and 166 includes a split bearing 170. The pair of bearings 170 form a through bore 172 for receiving the conduit 146 for shaping and scraping. The clamps 164 and 166 are locked in a closed position surrounding the conduit 146, as shown in FIGS. 34-36, by a locking mechanism generally designated by the numeral 174. As shown in FIG. 32, the locking mechanism 174 includes a block 176 mounted on the clamp 164 adjacent the face opposite the pinned connection of the clamps 164 and 166. Another block 178 is mounted in a corresponding position on the clamp 166 so that when the clamps 164 and 166 are in the closed position the blocks 176 and 178 are in abutting relation as shown in FIGS. 29 and 31.

A bolt 180 is threadedly retained in the block 178 and advances longitudinally upon rotation of nut 182 on the end of bolt 180. Bolt 180 has an enlarged end portion 184. Block 176 on clamp 164 is slotted to receive bolt 180 when the clamp 164 and 166 are in the closed position. When the bolt 180 extends through the slot of block 176, the clamps 164 and 166 are in the closed position as shown in FIG. 31 and 34. Rotation of the nut 182 with the shaft of the bolt 180 in the slot of block 176 draws the bolt enlarged end portion 184 into abutting relation with a shoulder of block 176. In this position the clamps 164 and 166 are secured in surrounding closed relation with the conduit 146.

Figure 34:
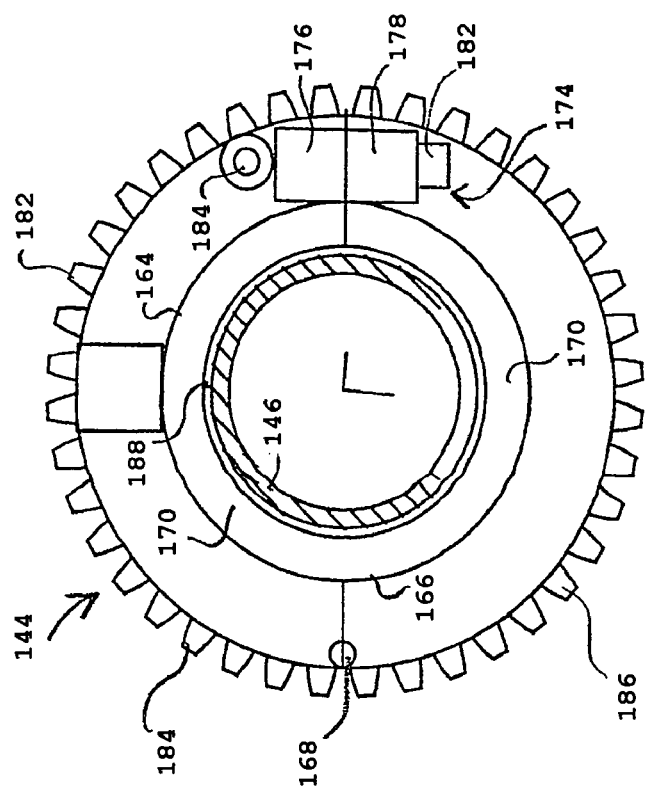
FIG. 34 is a view of the scraper tool similar to FIG. 33, illustrating the split housing of the tool pivoted from an open position to a closed position in surrounding relation with the conduit.

Once the clamps 164 and 166 are locked in surrounding relation with the conduit 146 as shown in FIGS. 34 and 35, the scraping operation is completed by rotation of the scraper tool assembly 144 around the conduit 146. Rotation of the scraper tool assembly 144 is accomplished by transfer of rotation from the drive gear 154 on the drive frame 148 to the spur gear 132 nonrotatably mounted on the periphery of the clamps 164 and 166. The spur gear 132 is formed by two segments 184 and 186 of equal radius bolted to the ends of the clamps 164 and 166.

The gear segments 184 and 186 form a continuous circumference of gear teeth, as shown in FIG. 35, that engage the drive gear 154 and the pair of idler gears 162 on the drive frame 148, as shown in FIG. 36. The gear segments 184 and 186 are shown in FIG. 36. The gear segments 184 and 186 are shown in FIGS. 32 and 33 where the clamps 164 and 166 are in the open position for receiving the conduit 146. When the clamps 164 and 166 are pivoted from the open to the closed position in surrounding relation with the conduit 146, as shown in FIG. 34, the clamps 164 and 166 are locked in place by the locking mechanism 174. As a result, the gear segments 184 and 186 form a complete spur gear on the periphery of the scraper tool assembly 144.

Removal of material from the surface of the conduit 146 is accomplished by rotation of the blade 188 with the clamps 164 and 166 locked in a closed position around the conduit 146. The blade 188 is supported on the clamp 164 to extend into the through bore 172. The blade 188 includes a cutting edge that extends longitudinally on the exterior surface of the clamp 164 a preselected length on the conduit 146. As with the cutter blade 180 shown in FIGS. 18-21 and discussed above, the position of the cutter blade 188 is adjustable on the clamp 164 to control the depth of cut by the blade cutting edge into the surface of the polyethylene conduit 146. The position of the blade cutting edge is adjustable to increase or decrease the amount of material removed from the surface of the conduit 146 completely around the conduit 146. The cutter blade 188 is also retractable from the through bore 172.

To initiate the conduit scraping operation, the tool assembly 144 is moved into position adjacent the conduit 146, such as an underground polyethylene pipe, with the pivotally connected clamp portions 164 and 166 moved from a closed position to an open position to receive the conduit 146, as shown in FIG. 32. Se also FIGS. 37A, 37B, and 37C. In the open position of the tool assembly 144, the clamp 164 is positioned on the conduit 146 (FIG. 33). Thereafter the opposite clamp 166 is pivoted into surrounding relation with the bottom of the conduit 146, as shown in FIG. 33. The clamp 166 is then locked to the clamp 164 by the locking mechanism 174. With this arrangement, as shown in FIG. 34, the conduit 146 is positioned in the scraper tool 144 with the cutter blade 188 positioned on the surface of the conduit 146 for removing material therefrom.

With the scraper tool 144 locked on the conduit 146, the drive frame 148 is moved into position on the tool 144, as shown in FIGS. 35 and 36 and FIGS. 37E and 37F. The gears 154 and 156 mesh with the spur gear 182. Torque transmitted by a wrench to the drive gear 154 rotates drive gear 154. Rotation of drive gear 154 is transmitted to the spur gear 182. Rotation of the spur gear 182 rotates the tool assembly 144 around the conduit 146. The cutter blade 188 rotates with the tool assembly 144. With the cutter blade 188 engaging the surface of the conduit 146, rotation of the blade 188 removes a selected thickness of material from the surface of the conduit 146.

The operation as sequentially illustrated in FIGS. 37A, 37B, 37C, 37D, 37E, and 37F is preferably used in keyhole technology to prepare the surface of underground polyethylene fluid lines (gas and water) for repair by electrofusion. However, it should be understood that the present invention is not confined to keyhole technology and is utilized in any application requiring the preparation of polyethylene pipe surface for repair where it is required to remove dirt and/or oxidation from the pipe surface.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Apparatus for preparing the surface of polyethylene conduit comprising:
   a stationary frame positioned in surrounding relation with the conduit extending axially through said frame,
   a housing rotatably positioned within said frame adjacent to the conduit,
   support means for rotatably supporting said housing within said frame for rotation of said housing around the conduit,
   a scraper tool assembly mounted on said housing in a fixed longitudinal position for rotation with said housing around the surface of the conduit,
   said scraper tool assembly including a blade having a cutting edge extending longitudinally a preselected length on the conduit,
   adjustment means on said scraper tool assembly for moving said cutting edge into and out of contact with the surface of the conduit to remove a uniform layer of material from the surface of the conduit, and
   drive means for rotating said housing within said stationary frame to rotate said scraper tool assembly around the surface of the conduit so that said cutting edge removes a layer of material from the surface of the conduit the length of said cutting edge completely around the conduit.

2. Apparatus for reshaping the surface of a polyethylene conduit comprising,
   a pair of split clamps, each pair of split clamps including a first semicylindrical shaped portion and a second semicylindrical shaped portion forming a cylindrical opening therebetween,
   each of said first and second semicylindrical shaped portions positioned in spaced surrounding relation with the polyethylene conduit having a surface being out of round,
   a split cylindrical housing having a pair of oppositely positioned members movable into and out of surrounding compressive relation with said pair of split clamps on the polyethylene conduit, and
   means for connecting said cylindrical housing members to apply a radial compressive force on said first and second semicylindrical shaped portions of said pair of split clamps to compress the polyethylene conduit within said cylindrical opening to restore the surface of the conduit to a round configuration.

3. A method for preparing the surface of a polyethylene conduit comprising the steps of:
   rotatably supporting a blade having a cutting edge adjacent to the surface of the conduit,
   positioning the cutting edge to extend a preselected length on the surface of the conduit,
   moving the cutting edge radially into contact with the surface of the conduit, and
   rotating the blade around the conduit to advance the cutting edge into the surface of the conduit to remove a layer of material from the surface of the conduit the length of the cutting edge.

4. Apparatus for preparing the surface of polyethylene conduit as set forth in claim 1 in which,
   said house includes a split cylindrical structure forming an axial bore, and
   a split bearing clamp positioned within said bore for receiving the conduit for scraping the surface of the conduit.

5. Apparatus for preparing the surface of polyethylene conduit as set forth in claim 4 in which,
   said split cylindrical structure includes a first cylindrical portion and an opposing second cylindrical portion,
   said first cylindrical portion being connected to said frame, and said second cylindrical portion being movable into and out of a clamp connection with the first cylindrical portion surrounding the conduit.

6. Apparatus for preparing the surface of polyethylene conduit as set forth in claim 4 which includes,
said scraper tool assembly being mounted on said split cylindrical structure for rotation on said frame around the conduit, and
said scraper assembly being movable radially on said split cylindrical structure toward and away from the surface of the conduit to adjust the depth of cut of said cutting edge into the conduit for removing a selected amount of material from the surface of the conduit.

7. Apparatus for preparing a surface of polyethylene conduit as set forth in claim 1 in which,
said housing includes opposed semicircular portions urged into compressive relation with the conduit to bring an out of round configuration of the conduit into a round configuration, and
said opposed semicircular portions surrounding the conduit to exert a radial compressive force on the conduit to reshape the conduit by removing any out of roundness in the circumference of the conduit.

8. Apparatus for preparing the surface of polyethylene conduit as set forth in claim 1 in which said adjustment means includes,
a drive screw rotatably supported within said housing,
a blade holder connected to a lower end of said drive screw for receiving said blade, and
said drive screw upon rotation relative to said housing radially advances said blade holder toward and away from the surface of the conduit to adjust the position of said blade relative to the surface of the conduit for removing a selected amount of material from the surface of the conduit.

9. Apparatus for preparing the surface of polyethylene conduit as set forth in claim 1 in which,
said scraper tool assembly includes a drive screw rotatably supported in said housing to advance upon rotation toward and away from the surface of the conduit,
a blade holder connected to a lower end of said drive screw adjacent to the surface of the conduit, and
said blade connected to said blade holder so that upon rotation of said drive screw said blade is movable into cutting engagement with the surface of the conduit for removing a selected amount of material from the surface of the conduit as said scraper tool assembly is rotated with said housing around the conduit.

10. Apparatus for preparing the surface of polyethylene conduit as set forth in claim 9 which includes,
a control wheel rotatably supported on said blade holder, and
said control wheel having a peripheral surface spaced a preselected distance from said blade cutting edge to allow said blade cutting edge to cut a preselected depth into the surface of the conduit and remove material from the surface of the conduit until said control wheel moves into contact with the surface of the conduit to prevent said blade from extending into the conduit beyond the point where the control wheel contacts the conduit.

11. Apparatus for preparing the surface the polyethylene conduit as set forth in claim 1 in which,
said drive means for rotating said housing includes a first gear rotatably supported on said frame and a second gear rotatably supported on said housing, and
said first gear meshing with said second gear so that upon the application of torque to said first gear rotation is transmitted by said first gear to said second gear to rotate said scraper tool assembly around the conduit so that said blade cutting edge removes a layer of material from the conduit.

12. Apparatus for reshaping the surface of a polyethylene conduit as set forth in claim 2 which includes,
at least one pair of elongated bolts for connecting said pair of oppositely positioned members of said split cylindrical housing in surrounding relation with said pair of split clamps on the polyethylene pipe, and
said pair of oppositely positioned members being movable on said pair of bolts to provide selected separation from and movement into surrounding relation with said pair of split clamps.

13. Apparatus for reshaping the surface of a polyethylene conduit as set forth in claim 2 which includes,
said first and second semicylindrical shaped portions of each of said pair of split clamps forming an axial bore therethrough for receiving the polyethylene conduit, and
said pair of oppositely positioned members of said split cylindrical housing forming an axial bore therethrough for receiving said pair of split clamps.

14. Apparatus for reshaping the surface of a polyethylene conduit as set forth in claim 13 which includes,
said first and second semicylindrical shaped portions having opposed surfaces,
said opposed surfaces being brought into abutting relation when said cylindrical housing members are compressed together around the polyethylene conduit to compress the conduit to reshape the conduit to a concentric configuration.

15. Apparatus for reshaping the surface of a polyethylene conduit as set forth in claim 2 which includes,
said pair of split clamps being compressed by said cylindrical housing members tightened into compressive relation with the polyethylene conduit to restore an out of round polyethylene conduit to an original concentric configuration.

16. A method as set forth in claim 3 which includes,
Positioning a split bearing clamp in surrounding relation with the conduit, and
urging the split bearing clamp into compressive relation with the conduit to exert a radial compressive force on the conduit to reshape the conduit by restoring an out of round configuration of a conduit to a round configuration.

17. A method as set forth in the claim 16 which includes,
after restoring the conduit to a round configuration, removing a layer of material from the outer surface of the conduit to prepare the conduit for an electrofusion process.

18. A method as set forth in claim 3 which includes,
controlling the depth of cut of the blade cutting edge into the surface of the conduit for removing a selected amount of material from the surface of the conduit as the blade rotates around the conduit.

19. A method as set forth in claim 3 which includes,
controlling the depth the blade cutting edge extends into the surface of the conduit to prevent excessive amounts of material from being removed from the surface of the conduit by the blade.

20. A method as set forth in claim 3 which includes,
Transmitting rotation to the blade with a cutting edge maintained engaged with the surface of the conduit to rotate the blade around the complete circumference of the conduit and remove a selected thickness of material from the surface of the conduit.

* * * * *